US012792200B2

(12) United States Patent
Wright et al.

(10) Patent No.: US 12,792,200 B2

(45) Date of Patent: Nov. 10, 2026

(54) IDENTIFYING USER INTERFACES OF AN APPLICATION

(71) Applicant: Automation Anywhere, Inc., San Jose, CA (US)

(72) Inventors: Matthew Thomas Wright, Aptos, CA (US); Henry Victorio Lee, Jr., San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 387 days.

(21) Appl. No.: 18/103,331

(22) Filed: Jan. 30, 2023

(65) Prior Publication Data

US 2024/0220083 A1 Jul. 4, 2024

Related U.S. Application Data

(60) Provisional application No. 63/436,040, filed on Dec. 29, 2022.

(51) Int. Cl.

*G06F 3/0483* (2013.01)
*G06F 9/451* (2018.01)

(52) U.S. Cl.

CPC ............ *G06F 3/0483* (2013.01); *G06F 9/451* (2018.02)

(58) Field of Classification Search

CPC ........... G06F 3/0483; G06F 9/451; G06F 8/38
See application file for complete search history.

(56) References Cited

U.S. PATENT DOCUMENTS

| | | | |
|---|---|---|---|
| 5,949,999 | A | 9/1999 | Song et al. |
| 5,983,001 | A | 11/1999 | Boughner et al. |

(Continued)

FOREIGN PATENT DOCUMENTS

| | | |
|---|---|---|
| EP | 3133539 | 2/2017 |
| EP | 3675008 | 7/2020 |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Kieu D Vu
*Assistant Examiner* — Alvaro R Calderon, IV
(74) *Attorney, Agent, or Firm* — Jason A. Smith; Shumaker, Loop & Kendrick, LLP

(57) ABSTRACT

In one embodiment, a method is provided. The method includes obtaining a set of views of user interfaces for an application and a set of metadata associated with the set of views. The method also includes applying a set of strategies to a subset of the set of views of the user interfaces to generate a set of groupings of user interfaces. Each strategy of the set of strategies indicates one or more rules for identifying user interfaces. The method further includes determining whether a specified one of the groupings of the set of groupings is associated with a first user interface of the user interfaces. The method further includes in response to determining that the specified grouping is associated with the first user interface, generating an application strategy based on the set of strategies.

23 Claims, 9 Drawing Sheets

(56) References Cited

U.S. PATENT DOCUMENTS

| | | | |
|---|---|---|---|
| 6,118,939 | A * | 9/2000 | Nack ........................ G06F 9/451 717/109 |
| 6,133,917 | A | 10/2000 | Feigner et al. |
| 6,226,407 | B1 | 5/2001 | Zabih et al. |
| 6,389,592 | B1 | 5/2002 | Ayres et al. |
| 6,427,234 | B1 | 7/2002 | Chambers et al. |
| 6,473,794 | B1 | 10/2002 | Guheen et al. |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,954,747 | B1 | 10/2005 | Wang et al. |
| 6,957,186 | B1 | 10/2005 | Guheen et al. |
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,783,135 | B2 | 8/2010 | Gokturk |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Fotev |
| 8,365,147 | B2 | 1/2013 | Grechanik |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,724,907 | B1 | 5/2014 | Sampson et al. |
| 8,769,482 | B2 | 7/2014 | Batey et al. |
| 8,819,241 | B1 | 8/2014 | Washburn |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 8,966,458 | B2 | 2/2015 | Asai |
| 9,032,314 | B2 | 5/2015 | Mital et al. |
| 9,104,294 | B2 | 8/2015 | Forstall et al. |
| 9,171,359 | B1 | 10/2015 | Lund |
| 9,213,625 | B1 | 12/2015 | Schrage |
| 9,251,413 | B2 | 2/2016 | Meler |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Al. |
| 9,600,519 | B2 | 3/2017 | Schoning et al. |
| 9,621,584 | B1 | 4/2017 | Schmidt et al. |
| 9,934,063 | B2 | 4/2018 | Kaina |
| 9,934,129 | B1 | 4/2018 | Budurean |
| 9,946,233 | B2 | 4/2018 | Brun et al. |
| 9,965,139 | B2 | 5/2018 | Nychis |
| 9,990,347 | B2 | 6/2018 | Raskovic et al. |
| 10,015,503 | B1 | 7/2018 | Ahammad |
| 10,043,255 | B1 | 8/2018 | Pathapati et al. |
| 10,282,280 | B1 | 5/2019 | Gouskova |
| 10,489,682 | B1 | 11/2019 | Kumar et al. |
| 10,552,540 | B2 | 2/2020 | Marascu et al. |
| 10,592,738 | B2 | 3/2020 | Northrup |
| 10,654,166 | B1 | 5/2020 | Hall |
| 10,706,218 | B2 | 7/2020 | Milward et al. |
| 10,706,228 | B2 | 7/2020 | Buisson |
| 10,713,068 | B1 | 7/2020 | Zohar |
| 10,936,807 | B1 | 3/2021 | Walters |
| 10,963,731 | B1 * | 3/2021 | Sarkar ................. G06F 11/3688 |
| 11,099,972 | B2 | 8/2021 | Puszkiewicz |
| 11,176,443 | B1 | 11/2021 | Selva |
| 11,182,178 | B1 | 11/2021 | Singh et al. |
| 11,182,604 | B1 | 11/2021 | Methaniya |
| 11,243,803 | B2 | 2/2022 | Anand et al. |
| 11,263,391 | B2 | 3/2022 | Potts |
| 11,348,353 | B2 | 5/2022 | Sundell et al. |
| 11,614,731 | B2 | 3/2023 | Anand et al. |
| 11,642,783 | B2 | 5/2023 | Han et al. |
| 11,775,321 | B2 | 10/2023 | Singh et al. |
| 11,775,339 | B2 | 10/2023 | Anand et al. |
| 11,775,814 | B1 | 10/2023 | Anand et al. |
| 11,782,734 | B2 | 10/2023 | Ginoya et al. |
| 11,820,020 | B2 | 11/2023 | Goyal et al. |
| 2002/0029232 | A1 | 3/2002 | Bobrow et al. |
| 2002/0129039 | A1 | 9/2002 | Majewsku |
| 2003/0033590 | A1 | 2/2003 | Leherbauer |
| 2003/0101245 | A1 | 5/2003 | Srinivasan et al. |
| 2003/0114959 | A1 | 6/2003 | Sakamoto |
| 2003/0159089 | A1 | 8/2003 | DiJoseph |
| 2004/0083472 | A1 | 4/2004 | Rao et al. |
| 2004/0153649 | A1 | 8/2004 | Rhoads |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0033777 | A1 | 2/2005 | Moraes |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2006/0218110 | A1 | 9/2006 | Simske et al. |
| 2007/0030528 | A1 | 2/2007 | Quaeler et al. |
| 2007/0089101 | A1 | 4/2007 | Romanovskiy |
| 2007/0101291 | A1 | 5/2007 | Forstall et al. |
| 2007/0112574 | A1 | 5/2007 | Greene |
| 2007/0156677 | A1 | 7/2007 | Szabo |
| 2007/0233741 | A1 | 10/2007 | Shen |
| 2008/0005086 | A1 | 1/2008 | Moore |
| 2008/0027769 | A1 | 1/2008 | Eder |
| 2008/0028392 | A1 | 1/2008 | Chen et al. |
| 2008/0133052 | A1 | 6/2008 | Jones |
| 2008/0209392 | A1 | 8/2008 | Able et al. |
| 2008/0222454 | A1 | 9/2008 | Kelso |
| 2008/0263024 | A1 | 10/2008 | Landschaft et al. |
| 2008/0310625 | A1 | 12/2008 | Vanstone |
| 2009/0037509 | A1 | 2/2009 | Parekh et al. |
| 2009/0103769 | A1 | 4/2009 | Milov et al. |
| 2009/0116071 | A1 | 5/2009 | Mantell |
| 2009/0172814 | A1 | 7/2009 | Khosravi et al. |
| 2009/0199160 | A1 | 8/2009 | Vaitheeswaran et al. |
| 2009/0217309 | A1 | 8/2009 | Grechanik et al. |
| 2009/0249297 | A1 | 10/2009 | Doshi et al. |
| 2009/0313229 | A1 | 12/2009 | Fellenstein et al. |
| 2009/0320002 | A1 | 12/2009 | Peri-Glass et al. |
| 2010/0023602 | A1 | 1/2010 | Martone |
| 2010/0023933 | A1 | 1/2010 | Bryant et al. |
| 2010/0077475 | A1 | 3/2010 | Deschenes |
| 2010/0100605 | A1 | 4/2010 | Allen et al. |
| 2010/0106671 | A1 | 4/2010 | Li et al. |
| 2010/0138015 | A1 | 6/2010 | Colombo et al. |
| 2010/0235433 | A1 | 9/2010 | Ansari et al. |
| 2010/0251163 | A1 | 9/2010 | Keable |
| 2010/0275113 | A1 | 10/2010 | Bastos Dos Santos |
| 2011/0022578 | A1 | 1/2011 | Fotev |
| 2011/0055484 | A1 | 3/2011 | Eichenberger |
| 2011/0106284 | A1 | 5/2011 | Catoen |
| 2011/0145807 | A1 | 6/2011 | Molinie et al. |
| 2011/0197121 | A1 | 8/2011 | Kletter |
| 2011/0258195 | A1 * | 10/2011 | Welling ............... G06V 30/262 707/E17.09 |
| 2011/0267490 | A1 | 11/2011 | Goktekin |
| 2011/0276568 | A1 | 11/2011 | Fotev |
| 2011/0276946 | A1 | 11/2011 | Pletter |

(56) References Cited

U.S. PATENT DOCUMENTS

2011/0302570 A1 12/2011 Kurimilla et al.
2012/0011458 A1 1/2012 Xia et al.
2012/0042281 A1 2/2012 Green
2012/0124062 A1 5/2012 Macbeth et al.
2012/0131456 A1 5/2012 Lin et al.
2012/0143941 A1 6/2012 Kim
2012/0266149 A1 10/2012 Lebert
2012/0324333 A1 12/2012 Lehavi
2012/0330940 A1 12/2012 Caire et al.
2013/0145006 A1 6/2013 Tammam
2013/0173648 A1 7/2013 Tan et al.
2013/0227535 A1 8/2013 Kannan
2013/0236111 A1 9/2013 Pintsov
2013/0290318 A1 10/2013 Shapira et al.
2013/0301935 A1* 11/2013 Xue ........................ G06V 10/44 382/218
2014/0036290 A1 2/2014 Miyagawa
2014/0045484 A1 2/2014 Kim et al.
2014/0075371 A1 3/2014 Carmi
2014/0181705 A1 6/2014 Hey et al.
2014/0189576 A1 7/2014 Carmi
2014/0282125 A1* 9/2014 Duneau ................... G06F 9/451 715/762
2014/0379666 A1 12/2014 Bryon
2015/0082280 A1 3/2015 Betak et al.
2015/0235193 A1 8/2015 Cummings
2015/0301926 A1 10/2015 Giannelos
2015/0310268 A1 10/2015 He
2015/0347284 A1 12/2015 Hey et al.
2016/0019049 A1 1/2016 Kakhandiki et al.
2016/0034441 A1 2/2016 Nguyen et al.
2016/0055376 A1 2/2016 Koduru
2016/0063269 A1 3/2016 Liden
2016/0078368 A1 3/2016 Kakhandiki et al.
2017/0091615 A1 3/2017 Liu
2017/0270431 A1 9/2017 Hosabettu
2018/0113781 A1 4/2018 Kim
2018/0144042 A1 5/2018 Sheng
2018/0176416 A1 6/2018 Ewans
2018/0210824 A1 7/2018 Kochura
2018/0218429 A1 8/2018 Guo et al.
2018/0267885 A1* 9/2018 Budurean ........... G06F 11/3692
2018/0275835 A1 9/2018 Prag
2018/0276462 A1 9/2018 Davis
2018/0321955 A1 11/2018 Liu
2018/0322403 A1 11/2018 Ron
2018/0349730 A1 12/2018 Dixon
2018/0370029 A1 12/2018 Hall
2019/0005050 A1 1/2019 Proux
2019/0018675 A1* 1/2019 Ang .................... G06F 16/5854
2019/0026215 A1 1/2019 Agarwal
2019/0028587 A1 1/2019 Unitt
2019/0034041 A1 1/2019 Nychis
2019/0095440 A1 3/2019 Chakra
2019/0114370 A1 4/2019 Cerino
2019/0126463 A1 5/2019 Purushothaman
2019/0141596 A1 5/2019 Gay
2019/0188462 A1 6/2019 Nishida
2019/0205636 A1 7/2019 Saraswat
2019/0213822 A1 7/2019 Jain
2019/0250891 A1 8/2019 Kumar
2019/0266692 A1 8/2019 Stach et al.
2019/0317803 A1 10/2019 Maheshwari
2019/0324781 A1 10/2019 Ramamurthy
2019/0340240 A1 11/2019 Duta
2019/0377987 A1 12/2019 Price et al.
2020/0019767 A1 1/2020 Porter et al.
2020/0034976 A1 1/2020 Stone et al.
2020/0059441 A1 2/2020 Viet
2020/0065384 A1 2/2020 Costello
2020/0097742 A1 3/2020 Kumar et al.
2020/0104350 A1 4/2020 Allen
2020/0125635 A1 4/2020 Nuolf
2020/0147791 A1 5/2020 Safary
2020/0151444 A1 5/2020 Price et al.
2020/0151591 A1 5/2020 Li
2020/0159647 A1 5/2020 Puszkiewicz
2020/0159648 A1 5/2020 Ghare
2020/0249964 A1 8/2020 Fernandes
2020/0257764 A1 8/2020 Reisswig
2020/0273078 A1 8/2020 Xu
2020/0285353 A1 9/2020 Rezazadeh Sereshkeh
2020/0311210 A1 10/2020 Nama
2020/0334249 A1 10/2020 Canim
2020/0364291 A1 11/2020 Bentabet
2021/0042516 A1 2/2021 Panakkal
2021/0049128 A1 2/2021 Kernick
2021/0067492 A1* 3/2021 Mastracci ........... H04L 63/0254
2021/0107140 A1 4/2021 Singh
2021/0141497 A1 5/2021 Magureanu
2021/0216334 A1 7/2021 Barrett
2021/0248153 A1 8/2021 Sirangimoorthy
2021/0279166 A1 9/2021 Peng
2021/0333983 A1* 10/2021 Singh ........................ G06F 8/38
2021/0391004 A1 12/2021 Yudanov
2022/0245936 A1 8/2022 Valk
2022/0405094 A1 12/2022 Farquhar
2022/0413997 A1* 12/2022 Shi ......................... G06N 20/00
2023/0052190 A1 2/2023 Goyal et al.
2023/0053260 A1 2/2023 Goyal et al.
2023/0214239 A1* 7/2023 Singh ................... G06N 3/0464 715/704
2023/0419711 A1 12/2023 Ramnath

FOREIGN PATENT DOCUMENTS

WO 2019/092672 A2 5/2019
WO 2022/076488 4/2022

OTHER PUBLICATIONS

B.P. Kasper "Remote: a Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deplying and managing Web services: issues, solutions, and directions, 36 pages (Year: 2008).

Zhifang et al., Test automation on moble device, May 2010, 7 pages.

Non-Final Office Action for U.S. Appl. No. 17/230,492, mailed Oct. 14, 2022.

Notice of Allowance for U.S. Appl. No. 16/398,532, mailed Oct. 23, 2022.

Non-Final Office Action for U.S. Appl. No. 16/876,530, mailed Sep. 29, 2020.

Final Office Action for U.S. Appl. No. 16/876,530, mailed Apr. 13, 2021.

Notice of Allowance for U.S. Appl. No. 16/876,530, mailed Jul. 22, 2021.

Dai, Jifeng et al., "R-fcn: Object detectiom via region-based fully convolutional networks", Advances in neural information processing systems 29 (2016). (Year: 2016).

Ren, Shaoqing et al., "Faster r-cnn: Towards real0time object detection with region proposal network." Advances in neutral information processing systems 28 (2015). (Year: 2015).

Zhifang et al., Test automation on mobile device, May 2010, 7 pages.

International Search Report for PCT/US2021/053669, dated May 11, 2022.

(56) References Cited

OTHER PUBLICATIONS

Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: a Unified Embedding for Face Recognition and Clustering, by F. Schroff, D. Kalenichenko, J. Philbin, arXiv:1503.03832 (2015).
Luqman, et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462 filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Notice of Allowance for U.S. Appl. No. 18/126,935, mailed Jan. 10, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Non-Final Office Action for U.S. Appl. No. 17/160,082, mailed Feb. 15, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.
Non-Final Office Action for U.S. Appl. No. 18/094,305, mailed May 9, 2024.
Final Office Action for U.S. Appl. No. 17/160,084, mailed May 16, 2024.
Non-Final Office Action for U.S. Appl. No. 18/218,009, mailed May 20, 2024.
Final Office Action for U.S. Appl. No. 17/160,080, mailed Jun. 12, 2024.
Notice of Allowance for U.S. Appl. No. 17/389,300, mailed Jun. 27, 2024.
Non-Final Office Action for U.S. Appl. No. 17/160,082, mailed Jul. 24, 2024.
Final Office Action for U.S. Appl. No. 18/094,305, mailed Jul. 29, 2024.
Notice of Allowance for U.S. Appl. No. 16/458,138, mailed Sep. 16, 2024.

* cited by examiner

IDENTIFYING USER INTERFACES OF AN APPLICATION

CROSS-REFERENCE TO RELATED APPLICATIONS

This application claims priority from and the benefit of U.S. Provisional Patent Application No. 63/436,040 entitled "IDENTIFYING USER INTERFACES OF AN APPLICATION," filed on Dec. 29, 2022, the entire contents of which are incorporated herein by reference in their entirety.

TECHNICAL FIELD

Aspects of the present disclosure relate to identifying user interfaces of an application, and more particularly, identifying user interfaces based on one or more strategies.

BACKGROUND

Entities such as corporations, companies, businesses, etc., often use applications (e.g., software applications, web applications, etc.) to perform various functions, actions, tasks, operations. Users will often use processes or workflows when using one or more applications to perform the functions, actions, tasks, etc. For example, a user may use a series of user interfaces (in each application) and may interact with various user interface elements (e.g., buttons, text fields, etc.) to perform a task (e.g., to submit a repair request, to request technical support, to place an order, etc.). The timing and/or order of user interfaces and/or user interface elements (of an application) that the user interacts with (when performing a task, action, function, etc.) may be referred to as a process or workflow.

SUMMARY

The embodiments and examples described herein can be implemented in numerous ways, including as a method, system, device, apparatus (including computer readable medium and graphical user interface). Several embodiments of the invention are discussed below.

In one aspect, a method is provided. The method includes obtaining a set of views of user interfaces for an application and a set of metadata associated with the set of views. The method further includes applying a set of strategies to a subset of the set of views of the user interfaces to generate groupings of user interfaces. Each strategy of the set of strategies comprises one or more rules for identifying user interfaces. The method also includes determining whether a specified one of the groupings is associated with a first user interface of the set of views of user interfaces. The method further includes in response to determining that the specified grouping is associated with the first user interface, generating an application strategy based on the set of strategies.

In one embodiment, each strategy further comprises a set of parameters and the set of parameters comprises one or more of: a set of tabs that should be in the set of views, a set of user interface elements that should be in the set of views, a set of labels for the set of user interface elements, a set of words that should be in the set of views, a set of words that should not be in the set of views, a set of colors that should be in a set of views, and a set of thresholds for grouping views.

In one embodiment, the method further includes in response to determining that the specified grouping is not associated with the first user interface, applying a second set of strategies to a second subset of views to generate a second set of groupings of user interfaces.

In one embodiment, the method further includes applying the application strategy to the set of views of user interfaces for the application.

In one embodiment, applying the set of strategies to the subset of views includes generating one or more of a set of vectors and a set of hashes based on the subset of views.

In one embodiment, generating one or more of the set of vectors and the set of hashes includes generating the set of vectors based on a machine learning model and the subset of views, wherein the set of vectors represent one or more of visual features and textual features of the subset of views.

In one embodiment, applying the set of strategies to the subset of views further includes determining clusters of visual features based on the set of vectors and determining the set of groupings based on the clusters of visual features.

In one embodiment, generating the set of hashes comprises one or more of: hashing each view of the subset of views to generate the set of hashes and hashing text detected in the subset of views to generate the set of hashes.

In one embodiment, applying the set of strategies to the subset of views further includes determining the set of groupings based on hamming distances between pairs of hashes in the set of hashes.

In one embodiment, determining whether the specified grouping is associated with the first user interface includes providing the groupings to a user and determining, based on user input received in response to providing the groupings, whether the specified grouping is associated with the first user interface.

In one embodiment, determining whether the specified grouping is associated with the first user interface includes determining whether the specified grouping is associated with the first user interface based on a machine learning model.

In one embodiment, the method further includes generating one or more identifiers for the subset of views based on the set of strategies.

In one embodiment, the set of strategies are applied to subset of views sequentially.

In one embodiment, the set of strategies are applied to the subset of views in parallel.

In one embodiment, applying a set of strategies to a subset of the set of views of the user interfaces to generate groupings of user interfaces includes applying a first strategy to the subset of views to identify a first grouping of user interfaces and applying the second strategy to first grouping of user interfaces to identifying the specified one of the groupings.

In one embodiment, applying a set of strategies to a subset of the set of views of the user interfaces to generate groupings of user interfaces includes applying a first strategy to first portions of the subset of views and applying a second strategy to second portions of the subset of views.

In one aspect, an apparatus is provided. The apparatus includes a memory to store data and a processing device operatively coupled to the memory. The processing device is to obtain a set of views of user interfaces for an application and a set of metadata associated with the set of views, apply a set of strategies to a subset of the set of views of the user interfaces to generate groupings of user interfaces, wherein each strategy of the set of strategies comprises one or more rules for identifying user interfaces, determine whether a specified one of the groupings is associated with a first user interface of the set of views of user interfaces, and in response to determining that the specified grouping is associated with the first user interface, generate an application strategy based on the set of strategies.

In one embodiment, t generate the one or more of the set of vectors and the set of hashes the processing device is further to generate the set of vectors based on a machine learning model and the subset of views, wherein the set of vectors represent one or more of visual features and textual features of the subset of views.

In one embodiment, the processing device is further to in response to determining that the specified grouping is not associated with the first user interface, apply a second set of strategies to a second subset of views to generate a second set of groupings of user interfaces.

In one aspect, a non-transitory computer-readable storage medium is provided. The non-transitory computer-readable storage medium includes instructions that, when executed by a processing device, cause the processing device to obtain a set of views of user interfaces for an application and a set of metadata associated with the set of views, apply a set of strategies to a subset of the set of views of the user interfaces to generate groupings of user interfaces, wherein each strategy of the set of strategies comprises one or more rules for identifying user interfaces, determine whether a specified one of the groupings is associated with a first user interface of the set of views of user interfaces, and in response to determining that the specified grouping is associated with the first user interface, generate an application strategy based on the set of strategies.

Other aspects and advantages of the disclosure will become apparent from the following detailed description taken in conjunction with the accompanying drawings which illustrate, by way of example, the principles of the disclosure.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a user may perform a process/workflow using an application to perform a task, function, etc. Improving processes/workflows and/or automating processes/workflows is often useful and/or desirable. For example, saving time, steps, etc., on a workflow may allow users to complete tasks more quickly and thus complete more tasks within a period of time. Identifying the various user interfaces that are displayed, presented, provided, etc., by an application is an important aspect of improving and/or automation workflows. It may be difficult to identify how a workflow/process operates. For example, it may be difficult to determine which user interfaces are used during a workflow/process. Identifying various user interfaces if often a manual and/or time-consuming task.

The present disclosure describes embodiments, examples, and/or implementations for identifying user interfaces based on views (e.g., screenshots) of user interfaces (or views of portions of those user interfaces). The embodiments and/or examples described herein can identify user interfaces for applications based on the views, metadata for the views (e.g., data indicating user interactions with the views, application metadata such as the name/version of an application, a window name, etc.) and one or more strategies. The user interfaces may be automatically identified by a process discovery system which simplifies the process of identifying user interfaces and increases the efficiency of identifying user interfaces. Identifying the user interfaces using a process discovery system allows the process discovery system to identify workflows/processes more quickly/efficiently. The identified workflows/processes may allow an RPA system to generate bots to automate the workflows/processes.

Figure 1:
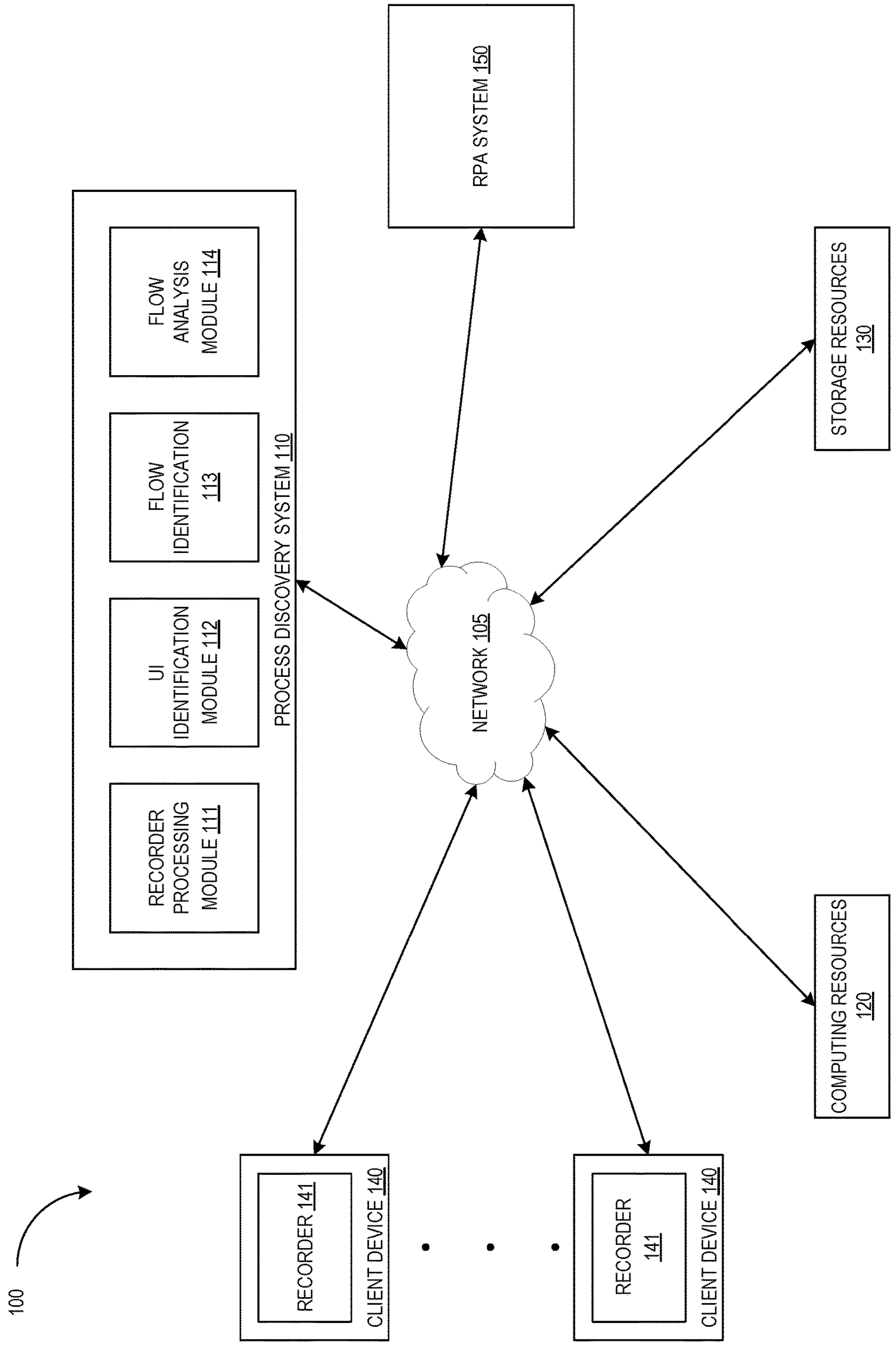
FIG. 1 is a block diagram that illustrates an example system architecture, in accordance with one or more embodiments of the present disclosure.

FIG. 1 is a block diagram that illustrates an example system architecture 100, in accordance with some embodiments of the present disclosure. The system architecture 100 includes a process discovery system 110, computing resources 120, storage resources 130, client devices 140, and a RPA system 150. One or more networks may interconnect the process discovery system 110, the computing resources 120, the storage resources 130, the client devices 140, and/or the RPA system 150. A network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g., cell towers), etc. The network may carry communications (e.g., data, message, packets, frames, etc.) between the client devices 140, the process discovery system 110, the computing resources 120 RPA system 150, and/or the storage resources 130.

In one embodiment, the process discovery system 110 may identify user interfaces (of applications) that are part of workflows (e.g., used in workflows) and/or may identify different workflows. For example, the process discovery system 110 may analyze views (e.g., screenshots) of user interfaces for applications and/or may analyze metadata associated with the views (e.g., data indicating the application name, application version, window name, positions of mouse clocks, keyboard input, etc.). The process discovery system 110 may identify discrete/individual user interfaces based on the views and/or metadata. The process discovery system 110 may also identify workflows/processes and the user interfaces that are used in those workflows/processes. For example, the process discovery system may identify/determine which user interfaces of an application are used to place an order, enter an invoice, etc.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the process discovery system 110, one or more of the computing resources 120 and the storage resources 130 may be part of the process discovery system 110 in other embodiments. For example, the process discovery system 110 may include both the computing resources 120 and the storage resources 130.

In one embodiment, the process discovery system 110 may be an application agnostic system. For example, the process discovery system 110 may be able to work with a multitude of different applications and/or different types of user interfaces (that may be provided, presented, displayed, etc., by the applications). The process discovery system 110 may provide a cloud-based infrastructure (e.g., in conjunction with computing resources 120 and/or storage resources 130) that may be used to identify workflows and/or processes that are performed when one or more applications are used to perform various tasks, functions, operations, etc.

In one embodiment, the process discovery system 110 may manage the allocation and/or use of computing resources 120 (e.g., computing clusters, server computers, VMs, containers, etc.). The computing resources 120 may be used for data transformation, feature extraction, development, generating training data, and testing of machine learning models, etc. The computing resources 120 may use various cloud service platforms (e.g., cloud computing resources). The process discovery system 110 may also manage the allocation and/or use of storage resources 130. The storage resources 130 may store strategies, machine learning models, views, metadata, and/or any other data used by the UI identification module 112, the client devices 140, and/or the RPA system 150.

As discussed above, identifying processes and/or workflows for applications is useful and/or beneficial. For example, identifying the steps, operations, actions, etc., in a process/workflow may allow for improvement of the process/workflow (e.g., decrease time to perform process, decrease number of steps to perform process, etc.). In one embodiment, the client devices 140 may be computing devices such as laptop computers, server computers, desktop computers, smartphones, table computers, etc. The client devices 140 may include applications (not illustrated in FIG. 1) that are used by users to perform the various processes/workflows. Each client device 140 includes a recorder 141. The recorder 141 may be hardware, software, and/or firmware that may capture/record views while a user interacts with an application to perform processes/workflows. The views (e.g., screenshots) may depict (e.g., show, display, etc.) the user interfaces of the application used to perform the processes/workflows. The recorder 141 may also capture/record user input provided to the client device 140 (e.g., location/duration of mouse clicks, keystrokes, etc.). The recorder 141 may provide the views of the user interfaces and/or user input (that was captured/recorded by the recorder 141) to the process discovery system 110, and/or may store the views/user input in the storage resources 130.

The process discovery system 110 includes a recorder processing module 111, a UI identification module 112, a flow identification module 113, and a flow analysis module 114. In one embodiment, the recorder processing module 111 may process/analyze the views and user input (recorded by the recorders 141) to identify user interface elements (e.g., buttons, text fields, menus, window names, drop down menus, tables, images, text, etc.) that are in the user interfaces depicted in the views.

In one embodiment, the UI identification module 112 may identify user interfaces based on views and one or more strategies. A strategy may include one or more rules, parameters, conditions, criteria, etc., for identifying user interfaces of applications, as discussed in more detail below. Multiple strategies may be combined to operate serially or in parallel, as discussed in more detail below. Identifying the user interfaces of an application allows the process discovery system 110 to determine which user interfaces are used for different workflows/processes, which allows the process discovery system 110 to determine how to improve workflows/processes.

In one embodiment, a flow identification module 113 may identify the workflows/processes performed by a user using one or more applications, based on the user interfaces identified/determined by the UI identification module 112. The flow identification module 113 may identify different sequences or orders of user interfaces and/or user interface elements that were used to perform a process/workflow.

In one embodiment, the flow analysis module 114 may analyze the processes/workflows (identified by the flow identification module 113) and may determine whether and how to improve the processes/workflows. For example, the flow analysis module 114 may identify alternative user interfaces that may be used to perform the same operation, function, task, etc. In another example, the flow analysis module 114 may determine whether and steps or actions can be removed from a process/workflow.

In one embodiment, the robotic process automation (RPA) system 150 may enable automation of repetitive and/or manually intensive computer-based tasks. The RPA system 150 may create a software robot (e.g., a bot), that may mimic the actions of a human being in order to perform various computer-based tasks. For instance, the RPA system 150 may generate a bot that may interact with one or more software applications through user interfaces, as a human being would do. This allows the RPA system 150 to generate bots that may perform the workflows/processes that were previously performed by a user. In other embodiments, bots can also interact with software applications or services by using application program interfaces (APIs).

As discussed above, identifying the various user interfaces that are displayed, presented, provided, etc., by an application allows the process discovery system 110 to identify and/or improve workflows. Identifying various user interfaces if often a manual and/or time-consuming task. For example, user interfaces are often identified by a user who may manually look at each view to identify the user interface that is associated with that view.

The embodiments and/or examples described herein can identify user interfaces for applications based on views and one or more strategies. This allows the process discovery system 110 to identify user interfaces for different applications more quickly, easily, and/or efficiently. Identifying the user interfaces using the process discovery system 110 also allows workflows/processes to be identified and/or improved more efficiently. For example, identifying a workflow allows users to view the applications/UIs that are used for the workflow and may allow users to change/optimize the workflow. In another example, identifying workflows allows the RPA system 150 to generate bots more quickly/efficiently.

Figure 2:
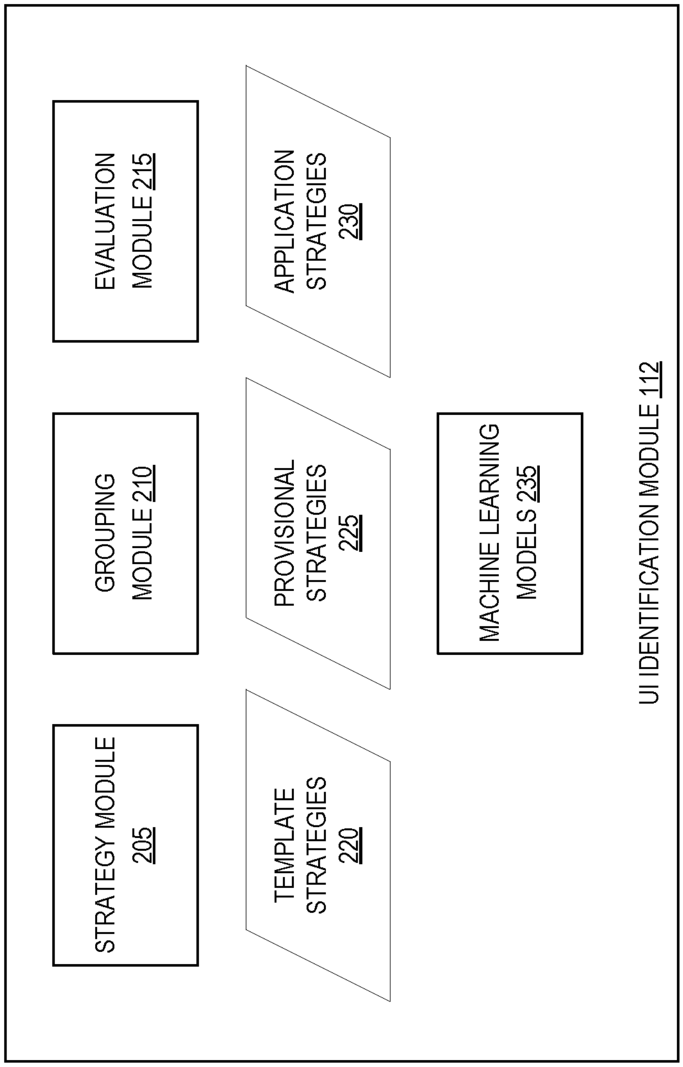
FIG. 2 is a diagram illustrating an example user interface (UI) identification module, in accordance with one or more embodiments of the present disclosure.

FIG. 2 is a block diagram that illustrates an example UI identification module 112, in accordance with one or more embodiments of the present disclosure. The UI identification module 112 includes a strategy module 205, a grouping module 210, an evaluation module 215, machine learning models 235, template strategies 220, provisional strategies 225, and application strategies 230. Some or all of the modules, components, systems, engines, etc., illustrated in FIG. 2 may be implemented in software, hardware, firmware, or a combination thereof.

In one embodiment, the strategy module 205 may include hardware, software, firmware, or a combination thereof that allows users to create and/or modify (e.g., edit, update, change, etc.) strategies that are used to classify user interfaces (e.g., GUIs, CLIs, other types of user interfaces, etc.) based on views of the user interfaces and/or metadata, as discussed in more detail below. For example, the strategy module 205 may provide a user interface that allows users to create strategies, remove strategies, edit (e.g., update, modify, change, etc.) strategies, save strategies, and/or create libraries (e.g., repositories, collections, etc.) of strategies.

In one embodiment, the views of the user interfaces (of one or more applications) may be screenshots of various user interfaces and/or portions of the various user interfaces of applications or software services (e.g., a software application, a web application, etc.) used by users to perform personal or business processes. A non-exhaustive listing of some examples of these applications or software services can include Microsoft Outlook, Word and Excel, Workday Inc. applications, and Salesforce Inc. applications. For example, the views of the user interfaces may be screenshots that were obtained (e.g., recorded, saved, etc.) by recorders 141 of client devices 140 (illustrated in FIG. 1). The views of the user interfaces may also be referred to as screen captures, captures, screen shots, images, etc.

In one embodiment, the metadata that is associated with one or more views may include data/information indicating the user interface elements (e.g., text, images, buttons, text fields, tables, etc.) that may be presented by the user interfaces. For example, the metadata may include a list of the user interface elements that are in the view and/or may include their locations (e.g., coordinates) within the view. The metadata may also include data/information indicating a user's interaction with the user interface elements. For example, the metadata may indicate which buttons, drop down menus, text fields, etc., that the user interacted with.

In another embodiment, the metadata may include information associated with the application associated with views of the user interface. For example, the metadata may include a window name or a title for the window of the application (wherein the user interface is presented/displayed to a user). In another example, the metadata may include a version number of the application. In a further example, the metadata may include a vendor, manufacture, or seller of the application.

In one embodiment, a strategy may be one or more rules, parameters, criteria, conditions, etc., for generating labels/identifiers for user interfaces that are associated with an event. An event may be a collection, group, snapshot, etc., of data that was captured (e.g., recorded, gathered, etc.) by a recorder (e.g., recorder 141 illustrated in FIG. 1) as a user interacts with the user interfaces of one or more application. For example, an event may include views of a user interfaces (e.g., screenshots), user interactions with the user interfaces (e.g., mouse clicks, mouse movements, keyboard inputs, etc.) and related input data, and metadata for the application (e.g., the name/title of the window for the application, the size of the window, the name of a document/file used by the application, a version number of the application, etc.).

In one embodiment, the UI identification module 112 (e.g., the grouping module 210) may use one or more strategies to identify user interfaces that satisfy the rules (e.g., criteria, conditions, etc.) of the strategy and may generate an identifier/label for the user interface. A strategy may include a rule indicating the type and/or location of content (e.g., text, images, logo images, etc.) that may be displayed in certain user interfaces. In another example, a strategy may include a rule indicating the type and/or location of user interface elements that may be in certain user interfaces. In a further example, a strategy may include a rule indicating specific content (e.g., specific words, images, etc.) that should be in certain user interfaces. The identifier/label for a user interface may be referred to as a signature, a screen signature, a UI signature, etc. The signature may identify, indicate, represent, etc., a single page or user interface within an application. For example, the signature/identifier/label may be an alpha numeric string, number, or other identifier, that represents a particular page in an application (e.g., a page in the application for placing an order for an item). Multiple strategies may be used or applied together in other embodiments. For example, a first strategy may be used, followed by a second strategy, etc. In another example, multiple strategies may be used in parallel (e.g., may be applied simultaneously). Using multiple strategies is discussed in more detail below.

A strategy may also include one or more parameters that allow for more control over how the strategy identifies user interfaces and/or generates identifiers (e.g., labels, signatures, etc.) for the user interfaces. One parameter may be a list of text/words that should be included in the views (e.g., a whitelist). For example, the parameter may be a list of words that are useful for identifying a particular process/workflow (e.g., word such as “Purchase,” “Price,” etc., which may indicate that a view is part of a workflow for purchasing an item). Another parameter may be a list of words that should not be included in the views (e.g., a blacklist). A further parameter may be the color of text, images, or other content in a view. For example, the parameter may indicate that red colored text should be included in a view. Another parameter may be a threshold for grouping views. For example, the threshold may indicate hamming distances, cluster/grouping sizes, how closely a cluster/group of views should be grouped together, etc. Another parameter may be tabs that should be included in the view. For example, a user interface may have multiple tabs. The parameter may identify tabs (e.g., may indicate the names of tabs, an order for the tabs, etc.) that should be included in the view. A further parameter may be user interface elements that should be included in the view. In particular, the user interface elements may be controls (e.g., buttons, dropdown menus, radio buttons, check boxes, etc.). The controls may also be referred to as control elements, user interface control elements, etc. Yet another parameter may be labels (e.g., names, identifiers) etc., for the user interface elements. For example, a parameter may indicate that there should be a “Submit” button.

Applying strategies (to views) to generate identifiers (e.g., signatures, labels, etc.) for the user interfaces allows the UI identification module 112 to determine which views have a high/higher degree of similarity with each other. For example, the UI identification module 112 may generate identifiers (e.g., labels, signatures, etc.) for different views. The views that have the same/similar identifiers may have a higher degree of similarity with each other and may be part of the same page or user interface of an application. Different strategies or sets of strategies may be used to identify different pages/user interfaces of an application, which may allow the process discovery system 110 (illustrated in FIG. 1) to identify which user interfaces are part of different workflows, and to automate and/or optimize the different workflows.

In one embodiment, the grouping module 210 may include hardware, software, firmware, or a combination thereof that for applying a set of strategies (e.g., one or more strategies) to one or more views of user interfaces of applications for the purpose of identifying UIs, as discussed in more detail below. The grouping module 210 may initially obtain (e.g., receive) a set of views of user interfaces (e.g., different user interfaces) for an application and may obtain a set of metadata associated with those views from recorder processing module 111 (illustrated in FIG. 1). In another example, the grouping module 210 may obtain (e.g., access, retrieve, etc.) the set of views and the associated metadata from storage resources 130 (illustrated in FIG. 1).

In one embodiment, the grouping module 210 may select, identify, etc., a subset of the set of views that is used to test a provisional strategy 225. For example, the grouping module 210 may randomly select one or more views from the set of views. A provisional strategy 225 may be a strategy that has not been finalized and/or has not been tested/validated by (e.g., has not been validated by the process discovery system 110 and/or a user). For example, a provisional strategy may be a strategy that has been newly created by a user and is under evaluation or testing to determine if it identifies particular application user interfaces with a satisfactory level of accuracy. The grouping module 210 may apply the one or more provisional strategies to the subset of views to generate, identify, etc., a set of groupings of user interfaces (e.g., initial clusters, test clusters, etc.). For example, the grouping module 210 may use the rules, criteria, thresholds, requirement, etc., of the set of strategies to generate the set of groupings of user interfaces.

In one embodiment, a single strategy may be used to identify multiple groupings of user interfaces. A single strategy may include multiple sets of rules and different sets of rules may identify different groupings of user interfaces. For example, a first set of rules in the single strategy may identify a first grouping of user interfaces based on the keywords in the content of the views. A second set of rules in the single strategy may identify a second grouping of user interfaces based on the color of text that is in the content of the views. And a third set of rules in the single strategy may identify a third grouping of user interfaces based on the presence of an image in a location within the views.

In one embodiment, a grouping of user interfaces may be a set, group, collection, cluster, etc., of views that correspond to a single user interface of an application. For example, a grouping of user interfaces may be views of the same user interface of an application. The views in the grouping (of user interfaces) may show (e.g., display, present, etc.) different portions of a user interface for the application. For example, a user interface for requesting technical support may have multiple fields, buttons, etc., that spans multiple pages. A grouping for the user interface (for requesting technical support) may include views of the different pages or portions of the page or screen of the user interface. The groupings of user interfaces may represent possible (e.g., candidate) user interfaces that have been identified by the grouping module 210.

In one embodiment, the grouping module 210 may also generate identifiers for the different groupings of user interfaces. For example, a strategy may be used to group together one or more views (of a user interface) that correspond to a particular user interface page or screen, and may be used to generate an identifier for that group of views. The identifier may be a number, string, alphanumerical characters, or any other data that may be used to identify the grouping and/or a user interface associated with the grouping. The identifiers may also be referred to as signatures, labels, etc.

In one embodiment, the grouping module 210 may generate the groups/clusters of views based on metadata associated with the views. For example, the metadata for a set of views may indicate the name of the application, a version of the application, a window name (e.g., the name of the window where the user interface of the application is displayed). The grouping module 210 may determine whether the metadata matches one or more rules of a provisional strategy 225. For example, the grouping module 210 may determine whether the window name matches a desired name. The grouping module 210 may also generate the identifiers/labels for the views, based on the metadata. For example, a label/identifier for a view may include the application name along with one or more keywords that were detected in the view (e.g., an example label may be ApplicationName_Keyword1_Keyword2).

In one embodiment, the evaluation module 215 may determine whether groupings of user interfaces (e.g., the clusters/groups that were identified by the grouping module 210) are part of the same user interface. For example, the evaluation module 215 may determine whether the views in a grouping of user interfaces depict different portions of the same user interface of the application, as discussed in more detail below. The evaluation module 215 may determine that a grouping (e.g., a cluster) of user interfaces correspond to the same user interfaces based on the identifiers (e.g., signatures/labels) for the user interfaces (that were generated by the grouping module 210 using the provisional strategies 225). For example, the evaluation module 215 may compare the identifiers generated for each of the user interfaces. The views that have the same and/or similar identifiers may correspond to the single/same user interface.

In one embodiment, the evaluation module 215 may use a machine learning model to determine whether groupings of views are part of user interfaces for an application. For example, a machine learning model may be trained based on training data that includes groups of views. The training data may also include reference data indicating whether those groups of views are part of particular user interfaces. As the machine learning model is used to evaluate groupings of views, additional reference data may be used to update/retrain the machine learning model (e.g., to updates the weights of the machine learning model). For example, the machine learning model may evaluate a group of views and may determine that the grouping of views do not correspond to a user interface. A user may review the results of the machine learning model and may determine that the group of views does correspond to the user interface. The grouping of views and the result (e.g., that the group of views does correspond to the user interface) may be added to the training data and the machine learning model may be retrained using the updated training data.

In one embodiment, the evaluation module 215 may generate an application strategy 230 based on the set of strategies (provisional strategies 225 that were used by the grouping module 210 to generate the groupings of user interfaces), in response to determining that the groupings generated by the grouping module 210 correspond to user interfaces of the application. For example, if the evaluation module 215 determines that a first grouping is associated with a first user interface, the evaluation module 215 may generate an application strategy 230 based on a set of provisional strategies 225. An application strategy 230 may be a strategy that can be used to correctly identify user interfaces of various applications, or at least correctly identify user interfaces with a certain threshold level of accuracy. For example, an application strategy 230 may be a provisional strategy that has been tested/validated to correctly identify user interfaces for an application. In some embodiments, generation of an application strategy involves promoting, or recategorizing, a provisional strategy to an application strategy given the determination that the provisional strategy correctly identifies a certain user interface with a threshold level of accuracy. In some embodiments, some or all of the application strategies 230 may be included in the template strategies 220. A template strategy 220 may be a strategy that has been saved for future use in identifying user interfaces. For example, a template strategy may be a strategy that was previously used to identify user interfaces for one application and has been determined (e.g., by a user or by an automated system/module) to be useful in identifying user interfaces for other applications. A template strategy 220 may also be used as a basis, template, starting point, framework, etc., for creating new strategies. For example, a template strategy 220 may be copied, and the copy may be modified to create a new strategy.

In one embodiment, the evaluation module 215 may apply the application strategy 230 to the set of views of the user interfaces for the application. As discussed above, the provisional strategies 225 were applied to a subset of the set of views. After determining that the groupings generated based on the provisional strategies 225 do correspond to user interfaces of the application, the application strategy or strategies 230 (which is based on the provisional strategies 225) are applied to the full set of views of user interfaces of the application.

In one embodiment, the evaluation module 215 may determine that one or more groupings of user interfaces are not associated with one or more user interfaces. For example, the evaluation module 215 may determine that some of the views in a grouping of user interfaces do not show views of the same user interface, but rather, show views of separate user interfaces (e.g., some views show a user interface for requesting technical support and other views show a user interface for submitting an expense report). If one or more groupings of user interfaces are not associated with one or more user interfaces, the evaluation module 215 may provide a message or other data to a user indicating that one or more groupings of user interfaces are not associated with nor have a certain level of similarity with one or more user interfaces of interest. For example, the evaluation module 215 may transmit a message (e.g., an email, a chat message, a text message, etc.) to a user indicating that one or more groupings of user interfaces are not associated with one or more user interfaces of interest.

In one embodiment, the UI identification module 112 may apply one or more additional strategies (e.g., a second provisional strategy 225, a second set of provisional strategies 225) to a second subset of views (e.g., a second subset of randomly selected views) to generate a second set of groupings of user interfaces (when the groupings of user interfaces are not associated with one or more user interfaces). For example, a user may select a second set of strategies using the strategy module 205 or the strategy module 205 may select the second set of strategies (e.g., automatically). The grouping module 210 may identify a second subset of views (e.g., may randomly select the second subset of views) and may apply the second set of strategies to the second subset of views to obtain the second set of groupings.

In one embodiment, the evaluation module 215 may determine whether a grouping of views is associated with a particular user interface by providing the grouping of views to a user. For example, the evaluation module 215 may transmit a message (that includes or indicates the grouping of views) to the user. In another example, the evaluation module 215 may display, present, show, etc., the grouping of views to a user. The user may provide user input indicating whether a grouping of views is associated with the user interface of interest. In a further example, the evaluation module 215 may determine (e.g., automatically) whether the grouping of views is associated with a particular user interface based on one or more rules, conditions, criteria, conditions, etc.

In one embodiment, the grouping module 210 may identify groupings or clusters of views by generating a set of vectors and/or a set of hashes based on the subset of views. For example, the grouping module 210 may generate one or more text vectors based on text that is depicted in the subset of views. The text vector may represent textual features (e.g., an ordering of words, the presence of specific words, text that matches a regular expressions, etc.). Generating a text vector may be referred to as text vectorization. In another example, the grouping module 210 may generate a hash for text in each of the views (e.g., may use a hashing algorithm/function to generate a hash using the text as input). A hash that is generating using text in a view may be referred to as a text hash. In a further example, the grouping module 210 may generate image vectors based on the views in the subset of views, as discussed in more detail below. In yet another example, the grouping module 210 may generate hashes of the views in the subset of views. For example, the grouping module 210 may use a hashing algorithm/function to generate a hash for each view. A hash that is generated based on the view (e.g., based on the screenshot) may be referred to as an image hash.

In one embodiment, the grouping module 210 may generate image vectors based on a machine learning model 235. For example, the grouping module 210 may provide the subset of views as an input to the machine learning model 235 and the machine learning model 235 may generate (e.g., output) the set of image vectors. The image vectors may represent visual features of the subset of views. For example, the image vectors may represent icons, portions of images, etc. The image vectors may also be referred to as feature vectors.

In one embodiment, the grouping module 210 may determine clusters (e.g., groups, sets, etc.) of visual features in the subset of views, based on the set of image vectors (e.g., a set of vectors). For example, the clusters of visual features may represent one or more visual features that are common and/or shared in the subset of views (e.g., a common logo, a common icon, etc.). The grouping module 210 may determine the set of groupings of user interfaces based on the clusters of visual features. For example, the common/shared visual features may indicate that some views in the subset of views are part of a same user interface. The grouping module 210 may group those views together based on the clusters of visual features (e.g., based on the common/shared visual features). The group/cluster of views may represent a same user interface.

Various methods, algorithms, systems, etc., may be used to identify visual features in the views. For example, a neural network (e.g., a convolutional neural network such as VGG16 or some other appropriate machine learning system) may receive the views as input. The neural network may identify the visual features within each view. For example, the classification head of the neural network may be removed, and the feature extraction layers of the neural network may be used to generate a vector that represents the features detected in a view. The vectors for the views may be compared with each other to identify similarities between the vectors. For example, the elements of the vectors may be compared with each other to find elements that are similar between vectors. The views associated with vectors that have similar elements may be grouped or clustered together. The group/cluster of views may represent a same user interface.

As discussed above, the grouping module 210 may also generate a set of hashes for one or more views. In particular, the grouping module 210 may generate image hashes and/or text hashes based on the set of views. For example, the group module 210 may use a hashing algorithm (e.g., dHash or some other appropriate hashing algorithm) on the view (e.g., on the image/screenshot) to generate hashes from the views. For example, dHash may use differences in adjacent pixels of a view and may encode that information into a hash or hashcode. The hashes for the views may be compared with each other to identify similar hash. The views associated with the similar hashes may be grouped or clustered together. The group/cluster of views may represent a same user interface.

In one embodiment, the grouping module 210 may determine (e.g., identify) the set of groupings based on hamming distances between pairs of hashes. For example, the grouping module 210 determine hashes for the text in one or more views. The grouping module 210 may calculate a set of hamming distances, one hamming distance for each pair of hashes. The grouping module 210 may use the hamming distances to identify clusters or groups of view. For example, the views that are associated with hashes that have a hamming distance above a threshold may be grouped or clustered together to form groups/clusters of views. The group/cluster of views may represent a same user interface.

The grouping module 210 may also generate vectors for text content that is in the views. In particular, the grouping module may use various algorithms, methods, systems, etc., for generating a vector for a view. For example, the grouping module 210 may use Word2Vec to generate a vector for each word that is in a view. Word2Vec may also average all of the vectors (for all of the words in a view) together to generate a single vector for a view. In another example, the grouping module 210 may use the BERT natural language processing (NLP) model (e.g., a transformer-based machine learning model) to process the text that is in a view. The BERT NLP model may generate a vector that represents the text in a view. The vectors for the views may be compared with each other to identify similarities between the vectors. The views associated with vectors that have similar elements may be grouped or clustered together.

In one embodiment, the grouping module 210 may use various clustering algorithms, techniques, method, algorithms, etc., to identify different groupings of user interfaces. For example, a strategy may use the Word2Vec model to condense the content in a view (e.g., the text in a view) into feature vectors of predetermined size. A clustering algorithm, such as DBSCAN, may be applied onto the feature vectors. The clustering algorithm (e.g., DBSCAN) may group together views that have similar feature vectors.

In one embodiment, the grouping module 210 may apply the set of strategies to the subset of views sequentially. For example, the grouping module 210 may apply a first strategy to the subset of views, then a second strategy to the subset of views, then a third strategy to the subset of views, etc. This may be referred to as chaining strategies or stacking strategies. By applying the strategies sequentially, each subsequent strategy may be applied to a smaller number of views. For example, the first strategy may be applied to 100 views and from those 100 views, a grouping of 50 views may be identified. A second strategy may be applied to those 50 views and from those 50 views, a grouping of 20 views may be identified, etc. Applying the strategies sequentially may allow the UI identification module 112 to identify groupings/clusters of views more quickly and/or efficiently. For example, rather than applying each strategy to all of the views, applying the strategies serially allows each subsequent strategy to be applied to a smaller number of views. This may reduce the amount of time and/or processing power used by the UI identification module 112.

In one embodiment, the grouping module 210 may apply different strategies (in the set of strategies) to different portions of a view from the subset of views. For example, the grouping module 210 may apply a first strategy to an upper half of each view (of the subset of views) and may apply a second strategy to a lower left quarter of each view, and may apply a third strategy to a lower right quarter of each view. Applying the different strategies to different portions of the views may allow the UI identification module 112 to identify groupings/clusters of views more quickly and/or efficiently. For example, rather than applying a strategy to a whole view, a strategy may be applied to a portion of a view which may include less content (e.g., less text, fewer images, etc.) to be evaluated against the rules of the strategy. This UI identification module 112 to determine whether the rules within the strategy are satisfied more quickly and/or efficiently. In addition, because the strategies are applied to different portions of a view, the UI identification module 112 may be able to apply the strategies simultaneously or in parallel. For example, the UI identification module 112 may use different processing cores, processors, etc., simultaneously to apply the different strategies to a view in parallel (e.g., one strategy may be applied using a first processor, a second strategy may be applied using a second processor, etc.).

One example of using multiple strategies (e.g., chaining/stacking strategies) may be using a first a strategy that identifies keywords in the title of an application window. The keywords may be identified based on metadata (e.g., application metadata indicating the title of the application windows) and/or OCR text (obtained by performing OCR on the view of the application window). After applying the first strategy to multiple views, a subset of those views may be identified by the first strategy. A second strategy may identify keywords in the content of the application window. The second strategy may be applied to the multiple views or to the subset of views (to chain the first and second strategies together). If the second strategy is applied to the multiple user interfaces, second strategy may identify a second subset of views. The overlapping user interfaces (e.g., user interfaces that in both the first subset and the second subset of views) may be part of the same user interface. If the second strategy is applied to the first subset of views, then a portion of the first subset of views may be part of the same user interface.

Figure 3:
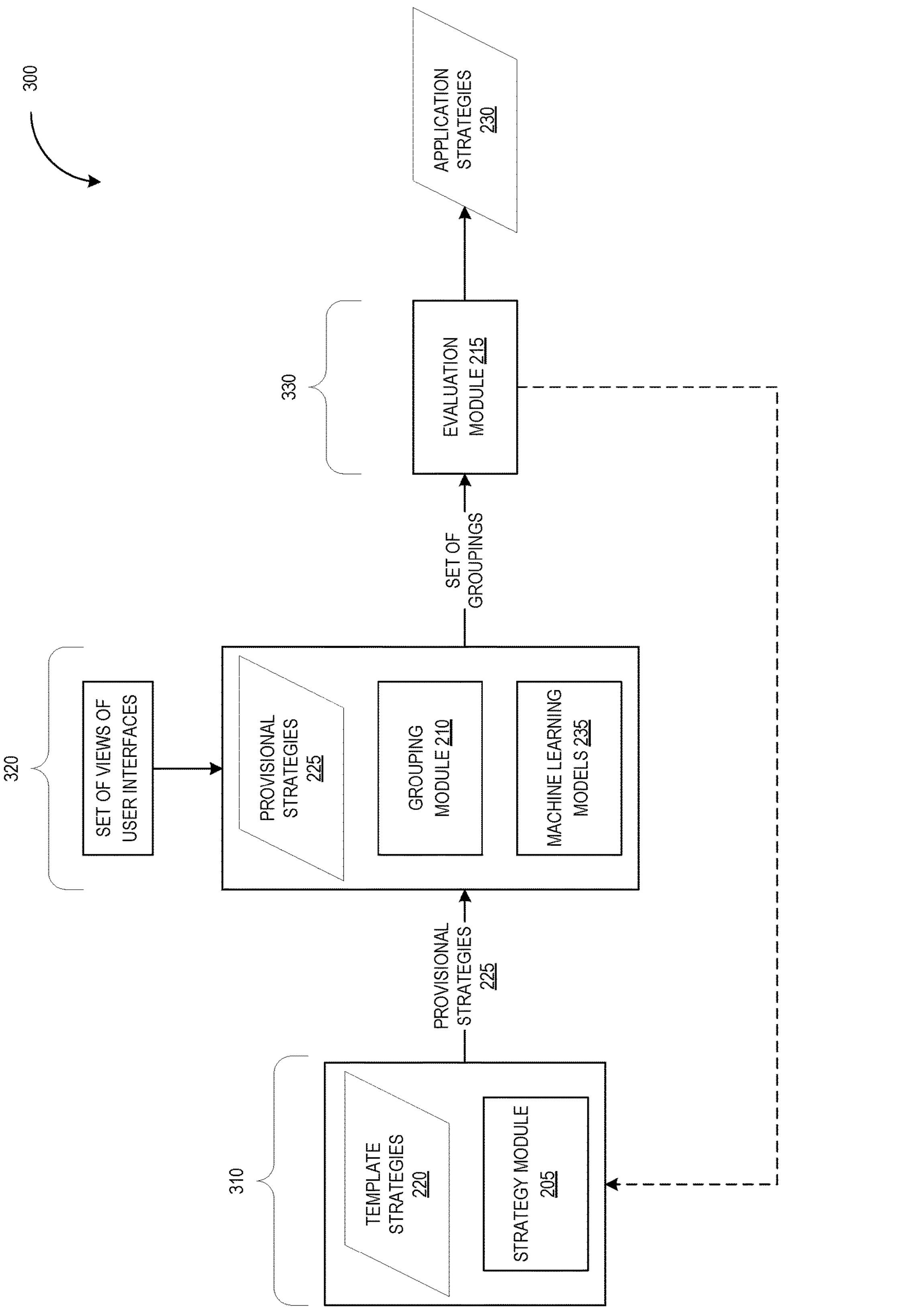
FIG. 3 is a block diagram that illustrates an example process for identifying user interfaces, in accordance with one or more embodiments of the present disclosure.

FIG. 3 is a block diagram that illustrates an example process 300 for identifying user interfaces, in accordance with one or more embodiments of the present disclosure. The process 300 may also be referred to as a cycle, loop, etc. The process 300 may be performed by the various modules, engines, components, and/or systems of the UI identification module 112 (illustrated in FIGS. 1 and 2). The process 300 includes three stages (e.g., phases, parts, portions, etc.), stage 310, stage 320, and stage 330. The process 300 may proceed from stage 310 to stage 320, to stage 330, and optionally back to stage 310. Each iteration of the process 300 may generate one or more application strategies 230.

In stage 310, the strategy module 205 may generate (e.g., create) one or more provisional strategies 225. For example, the strategy module 205 may provide an interface for users to create new provisional strategies 225 and/or to edit (e.g., update, modify, change, etc.) previous provisional strategies 225. As discussed above, the provisional strategies 225 may be new strategies that have not yet been verified or tested (e.g., strategies that have not yet been tested as to whether the strategies can correctly identify which views belong to a particular user interface). The provisional strategies 225 may be generated based on optional template strategies 220. For example, a user may select a template strategy 220 and may edit the template strategy 220 (e.g., add rules for text, images, locations of user interface elements, etc.). As discussed above, the templates strategies 220 may be a library, archive, repository, etc., of existing strategies that can be used to identify user interfaces of applications. Stage 310 may provide the provisional strategies 225 (e.g., a set of strategies that will be tested, evaluated, etc.) to the grouping module 210 at the end of stage 320.

In stage 320, the grouping module 210 may obtain a set of views of software application user interfaces and apply one or more provisional strategies to create groupings or clusters of user interfaces. For example, the grouping module 210 may access one or more storage resources (e.g., memory, a disk drive, cloud storage, etc.) where the set of views are stored. The set of views may include all of the views (e.g., screenshots) captured by the recorders that are deployed on client devices. The grouping module 210 may identify or select a subset of all of the views (e.g., randomly select the subset of views or select views based on various other parameters, such as date/time the view was captured, from which computing device the view was captured, etc.) and may test the provisional strategies 225 using the subset of views. Using a random subset of views (rather than all of the views) allows the grouping module 210 to test the provisional strategies more quickly.

The grouping module 210 may apply the provisional strategies 225 to the subset of views to generate an initial set of groupings of user interfaces. The initial set of groupings may represent possible (e.g., candidate) user interfaces that have been identified by the grouping module 210. For example, each identified group/cluster of user interfaces may correspond to the same user interface of a software application used by users to process or complete personal, work, or business tasks. The grouping module 210 may generate vectors and/or hashes when generating the set of groupings. For example, the grouping module 210 may generate hashes/vectors based on various algorithms, methods, etc., and may identify groups/clusters by identifying similar hashes/vectors. The grouping module 210 may also use one or more machine learning models (e.g., convolutional neural networks) 235 when generating the set of groupings. The grouping module 210 may provide the set of groupings to the evaluation module 215 at the end of stage 320.

In stage 330, the evaluation module 215 may determine whether the groupings do correspond to certain user interfaces of the application, and if so, then promote or recategorize provisional strategies as application strategies. For example, the evaluation module 215 may provide the groupings to a user (e.g., may display the set of groupings to a user via a GUI of the evaluation module 215). The user may provide user input indicating whether the one or more of the groupings correspond to different user interfaces of the application. In another example, the evaluation module 215 may determine (e.g., automatically determine) whether the groupings correspond to user interfaces of the application based on various methods, algorithms, systems, factors, rules, criteria, conditions, etc. For example, the evaluation module 215 may determine whether a grouping of views is part of the same user interface of the application based on a machine learning model.

If the evaluation module 215 determines that a threshold number of groupings do correspond to user interfaces of the application (e.g., the grouping of views is for the same user interface), the evaluation module 215 may save (or promote) the corresponding provisional strategy that identified the particular grouping as an application strategy 230. The evaluation module 215 may output (e.g., store) the application strategies 230 at the end of stage 330. These application strategies 230 may be reused as template strategies for creating new strategies and/or may be used to label, identify, etc., user interfaces for other applications.

If the evaluation module 215 determines that the set of groupings do not correspond to user interfaces of the application, the process 300 may transition back to stage 310 where the strategy module 205 may add, remove, edit, modify, change, etc., one or more strategies that will be used to generate a new set of groupings in the next iteration of the process 300.

Figure 4:
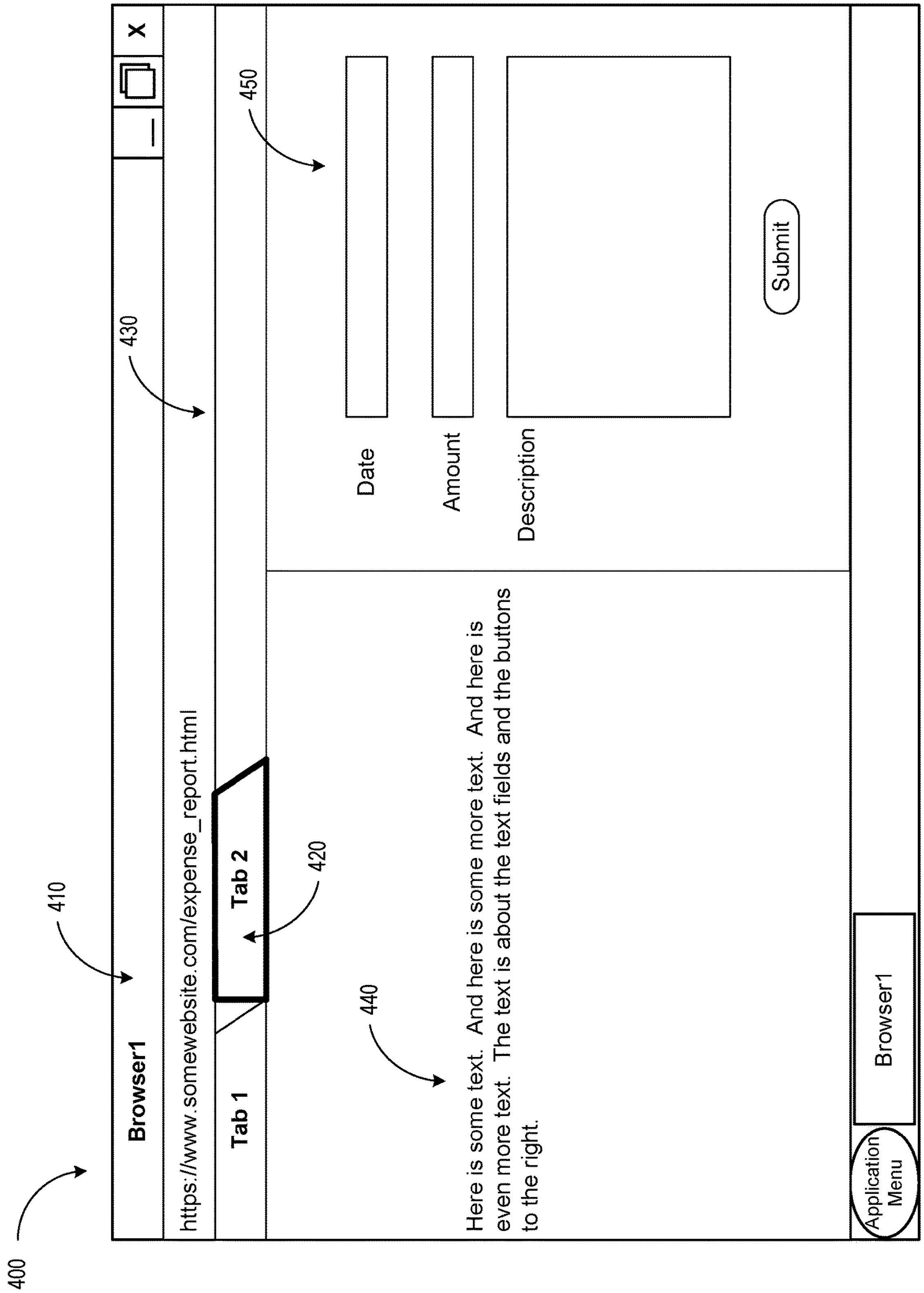
FIG. 4 is a diagram illustrating an example view, in accordance with one or more embodiments of the present disclosure.

FIG. 4 is a diagram illustrating an example view 400 (e.g., a screenshot), in accordance with one or more embodiments of the present disclosure. A client device (e.g., a computing device, a laptop computer, a desktop computer, client device 140 illustrated in FIG. 1) may provide the desktop environment for a user. The view 400 may depict, present, display, etc., the graphical user interface of the desktop environment. The graphical user interface includes one or more icons, windows, window previews, toolbars, folders, wallpapers, shortcuts, taskbars, application menus, application groups, and/or workspaces.

The view 400 also depicts a window Browser1 that is shown on the taskbar. The window Browser1 may be a window 410 for a browser for navigating between webpages on the Internet (e.g., a browser window). The universal resource locator (URL) 430 of the page displayed in the window Browser1 is also shown in the view 400. The window Browser1 (e.g., window 410) includes two tabs Tab1 and Tab2 (e.g., two browser tabs). Tab2 (e.g., tab 420) is the currently selected tab, as indicated by the bold outline around Tab2. The window Browser1 may display, present, etc., content 440 (e.g., the text on the left half of the window Browser1) and content 450 (e.g., the text fields and buttons on the right half of the window Browser1).

As discussed above, the UI identification module 112 may apply multiple strategies to the view 400. For example, a first strategy may be used to determine that the window is a browser window (e.g., window 410 named Browser 1), a second strategy may be used to determine which tab (of multiple tabs) is the current selected tab (e.g., tab 420), a third strategy may be used to identify the URL 430, a fourth strategy may be used to identify the content 440, and a fifth strategy may be used to identify the content 450. The UI identification module 112 may apply these strategies serially (e.g., in order from first through fifth) or in parallel. As discussed above, a strategy may include one or more rules to identify, generate, determine, etc., groupings of user interfaces (e.g., groupings of views). For example, a strategy can identify views that have a particular window title or certain keywords in the text content of the view. In another example, a strategy may identify views that have text with a certain color (e.g., green text, blue text, etc.). In a further example, a strategy may identify text where the background of the text has a certain color (e.g., text that is highlighted yellow).

Figure 5:
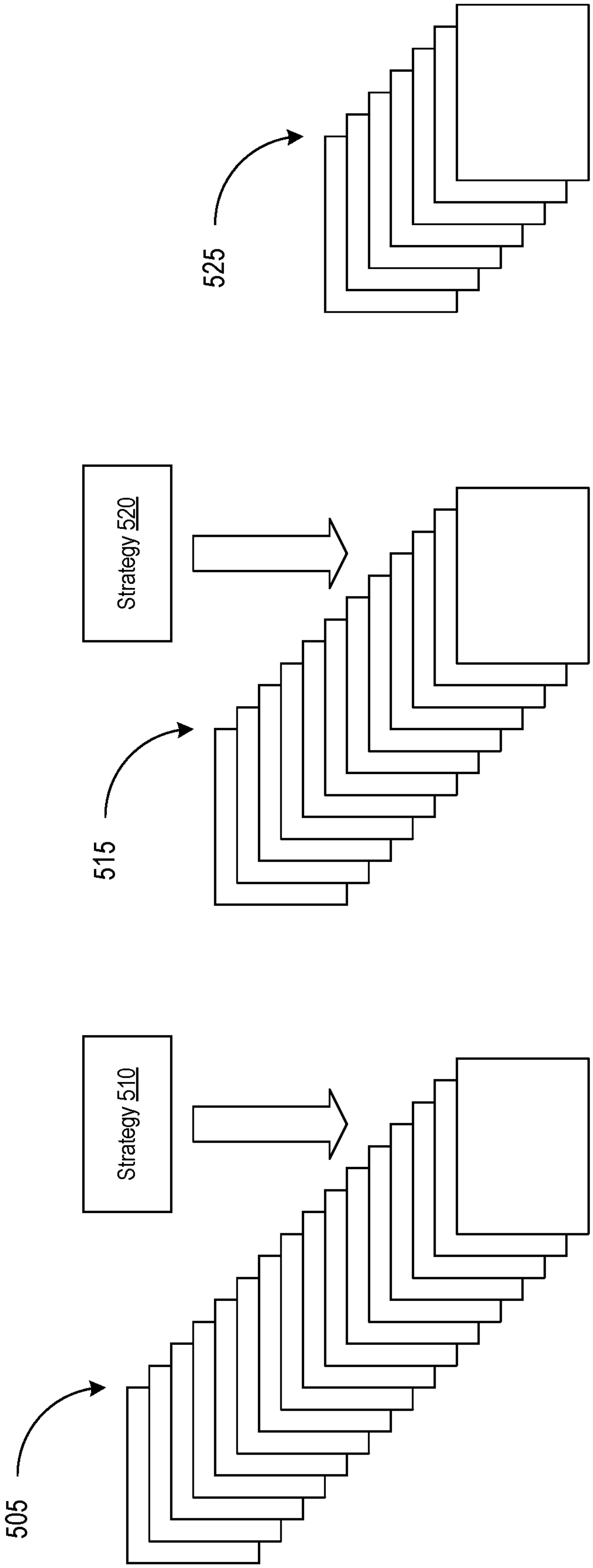
FIG. 5 is a diagram illustrating strategies for identifying user interfaces based on a set of views, in accordance with one or more embodiments of the present disclosure.

FIG. 5 is a diagram illustrating strategies 510 and 520 for identifying user interfaces based on each of respective sets of views 505 and 515, in accordance with one or more embodiments of the present disclosure. As discussed above multiple strategies may be applied to a set of views to identify user interfaces for an application. The multiple strategies may be applied serially. For example, a first strategy may be applied, then a second strategy, then a third strategy, etc.

As illustrated in FIG. 5, the UI identification module 112 (illustrated in FIGS. 1 and 2) may use (e.g., chain, combine, etc.) strategies 510 and 520 to identify user interfaces from the set of views 505. The UI identification module 112 may apply strategy 510 to views 505 to identify one or more views that satisfy the rules, parameters, etc., of strategy 510. Using strategy 510, the UI identification module 112 may select a identify a subset of the views 505 (e.g., one or more of the views 505). The subset of views that were selected from the views 505 are represented as views 515. The UI identification module 112 may apply strategy 520 to the views 515 to identify one or more views that satisfy the rules, parameters, etc., of strategy 520. Using strategy 510, the UI identification module 112 may select a identify a subset of the views 515. The subset of views that were selected from the views 515 may be represented as views 525. The views 525 may be the group/cluster of views that have been identified using strategies 510 and 520.

Figure 6A:
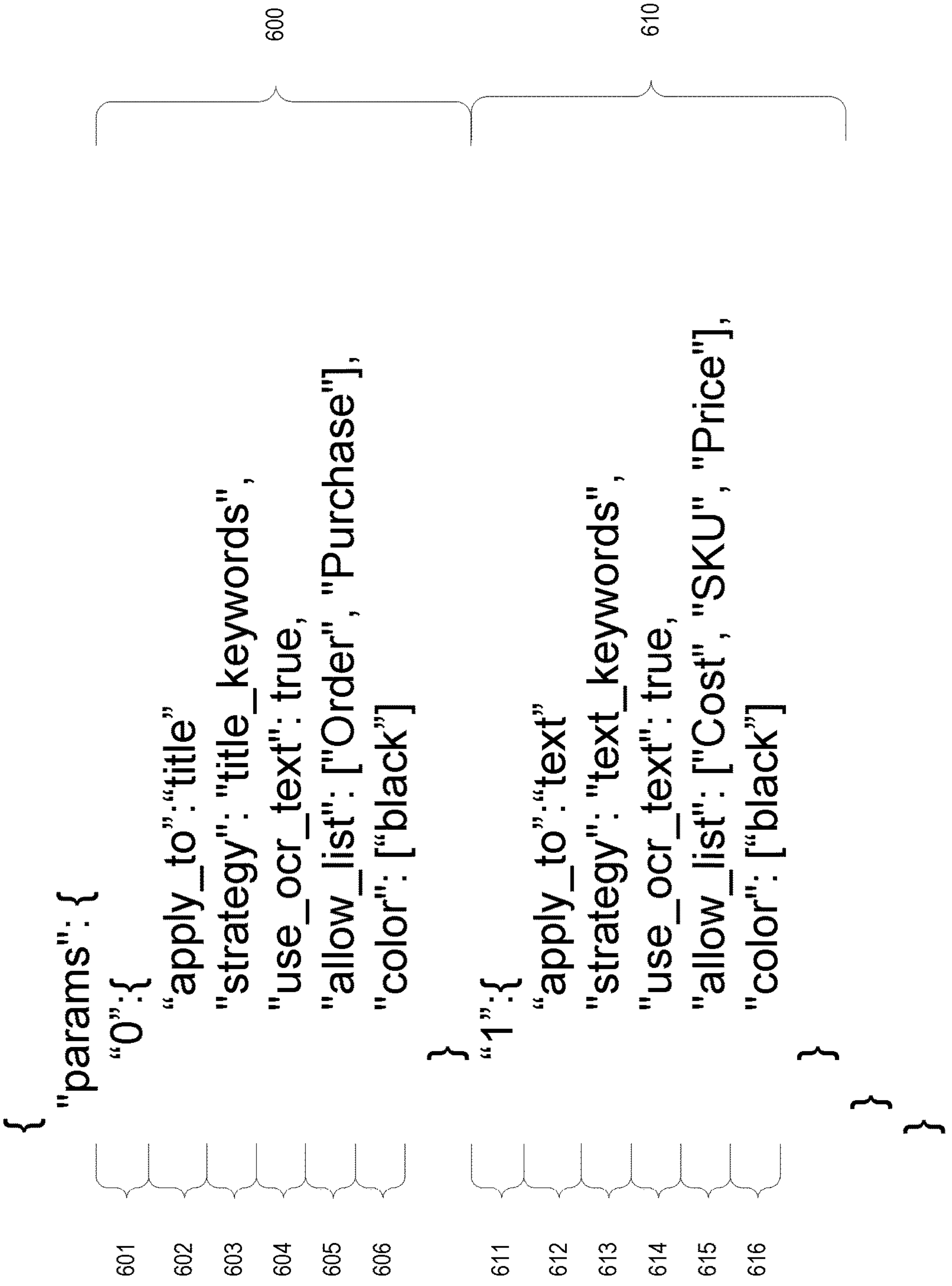
FIG. 6A is a diagram illustrating example strategies 600 and 610, in accordance with one or more embodiments of the present disclosure.

FIG. 6A is a diagram illustrating example strategies 600 and 610, in accordance with one or more embodiments of the present disclosure. As discussed above, a strategy may be used to generate identifiers (e.g., labels, signatures, etc.) for user interfaces and/or views (e.g., screenshots or images of user interfaces). A strategy may include one or more rules, parameters, criteria, etc., for determining whether views correspond to a same user interface of an application (e.g., whether the views show the same user interface of the application). The strategies 600 and 610 may be applied by the grouping module 210 (illustrated in FIGS. 2 and 3) to one or more views. The strategies 600 and 610 may be provisional strategies (e.g., strategies that have not been verified/tested) or application strategies.

The strategy 600 includes lines 601 through 606. Line 601 may indicate the beginning of the strategy 600 (e.g., indicating an index of 0 for the first strategy). Line 602 may indicate that the strategy should be applied to a title or heading section of a view. Line 603 may indicate that the strategy 600 is named "title_keywords." Line 604 may indicate that the strategy should use text in a view (e.g., text that is detected via optical character recognition (OCR)). Line 605 may indicate that the strategy should look for the words "Order" or "Purchase" in the title/heading section of a view. Line 605 may indicate that the color of the text in the title/heading section of a view should be black.

The strategy 610 includes lines 611 through 616. Line 611 may indicate the beginning of the strategy 610 (e.g., indicating an index of 1 for the second strategy). Line 612 may indicate that the strategy should be applied to a text/content section of a view. Line 613 may indicate that the strategy 610 is named "text_keywords." Line 614 may indicate that the strategy should use text in a view. Line 615 may indicate that the strategy should look for the words "Cost," "SKU," and "Price" in the title/heading section of a view. Line 616 may indicate that the color of the text in the title/heading section of a view should be black.

In one embodiment, the strategies 600 and 610 may be referred to as chained strategies, stacked strategies, etc. For example, the strategies 600 and 610 may be stacked, chained, or used together on one or more views. In particular, strategy 600 and strategy 610 may be applied to views in parallel (as illustrated in FIG. 4) to decrease the amount of time for analyzing the views. Alternatively, the strategy 600 and strategy 610 may be applied to view in serially (e.g., as illustrated in FIG. 5).

Figure 6B:
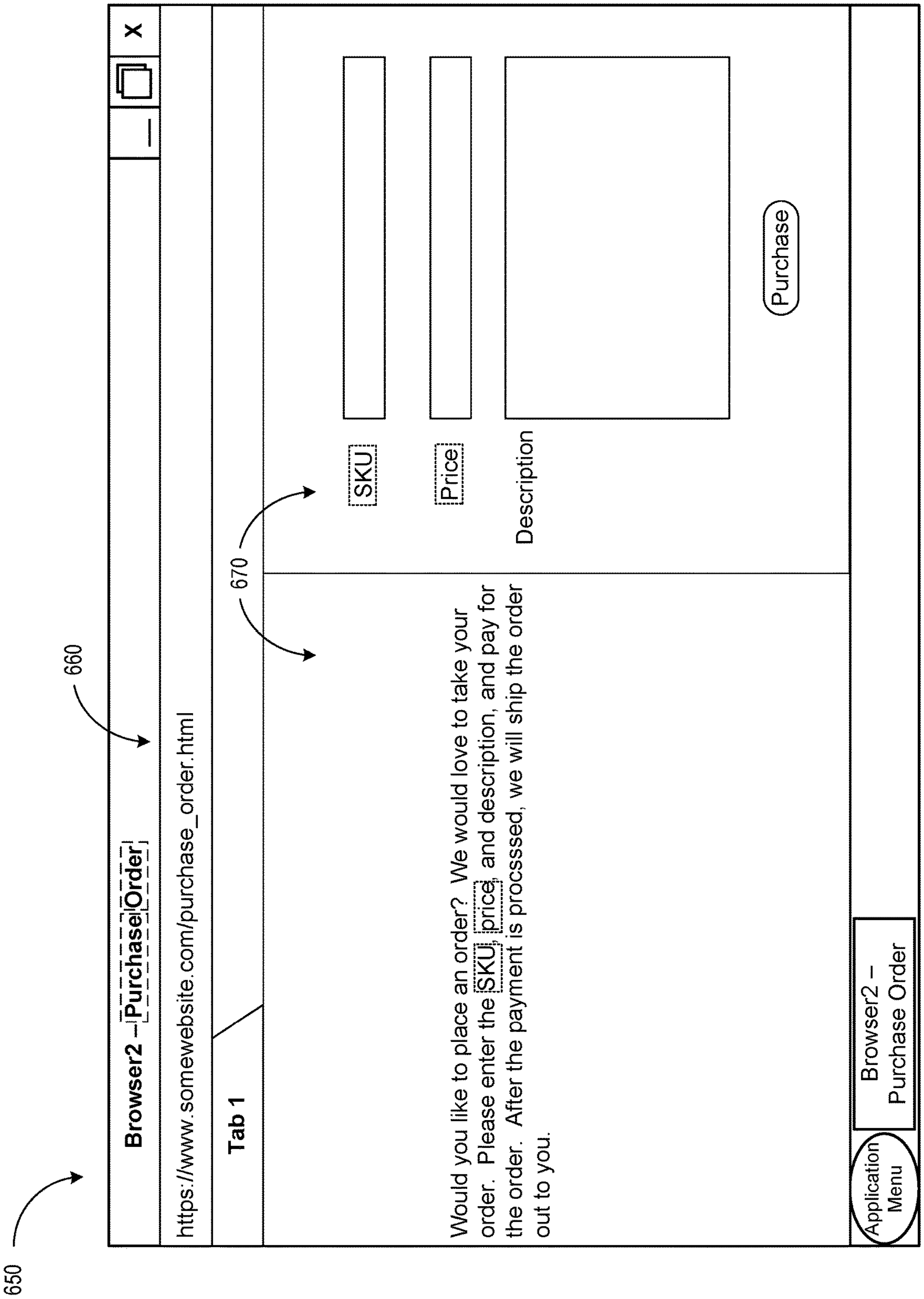
FIG. 6B is a diagram illustrating an example view, in accordance with one or more embodiments of the present disclosure.

FIG. 6B is a diagram illustrating an example view 650 (e.g., a screenshot), in accordance with one or more embodiments of the present disclosure. A client device (e.g., client device 160 illustrated in FIG. 1) may provide a desktop environment for a user. The view 650 may depict, present, display, etc., the graphical user interface of the desktop environment. The graphical user interface includes one or more icons, windows, window previews, toolbars, folders, wallpapers, shortcuts, taskbars, application menus, application groups, and/or workspaces.

The view 650 also depicts a window Browser2 that is shown on the taskbar. The window Browser2 may be a window for a browser for navigating between webpages on the Internet (e.g., a browser window). The window Browser2 includes tab Tab1 (e.g., a browser tab). The window Browser2 also includes a title/heading section 660. The window Browser2 may display, present, etc., content 670 such as the text on the left half (of the window Browser2) and, the text fields and buttons on the right half (of the window Browser2).

As discussed above, the UI identification module 112 may apply multiple strategies to the view 650. For example, strategy 600 (illustrated in FIG. 6A) may be used to determine that the window Browser2 has a title (e.g., a heading, a name, etc.) that includes one or more desired words. In particular, strategy 600 may be used to determine that the title includes one or more of the word "Purchase" and the word "Order," as illustrated by the dashed boxes. Strategy 610 (illustrated in FIG. 6B) may be used to determine that the content 670 of the window Browser2 includes a different set of desired words. May be used to determine that the content includes one or more of the words "SKU," "Price," and "Cost," as illustrated by the dotted boxes.

The UI identification module 112 may apply these strategies (e.g., strategies 600 and 610) serially (e.g., in order from first through fifth) or in parallel. For example, the UI identification module 112 may apply strategy 600 first to a set of views (e.g., 100 views). From that set of views, the strategy 600 may identify, select, etc., a subset of views (e.g., 25 out of those 100 views).

Figure 7:
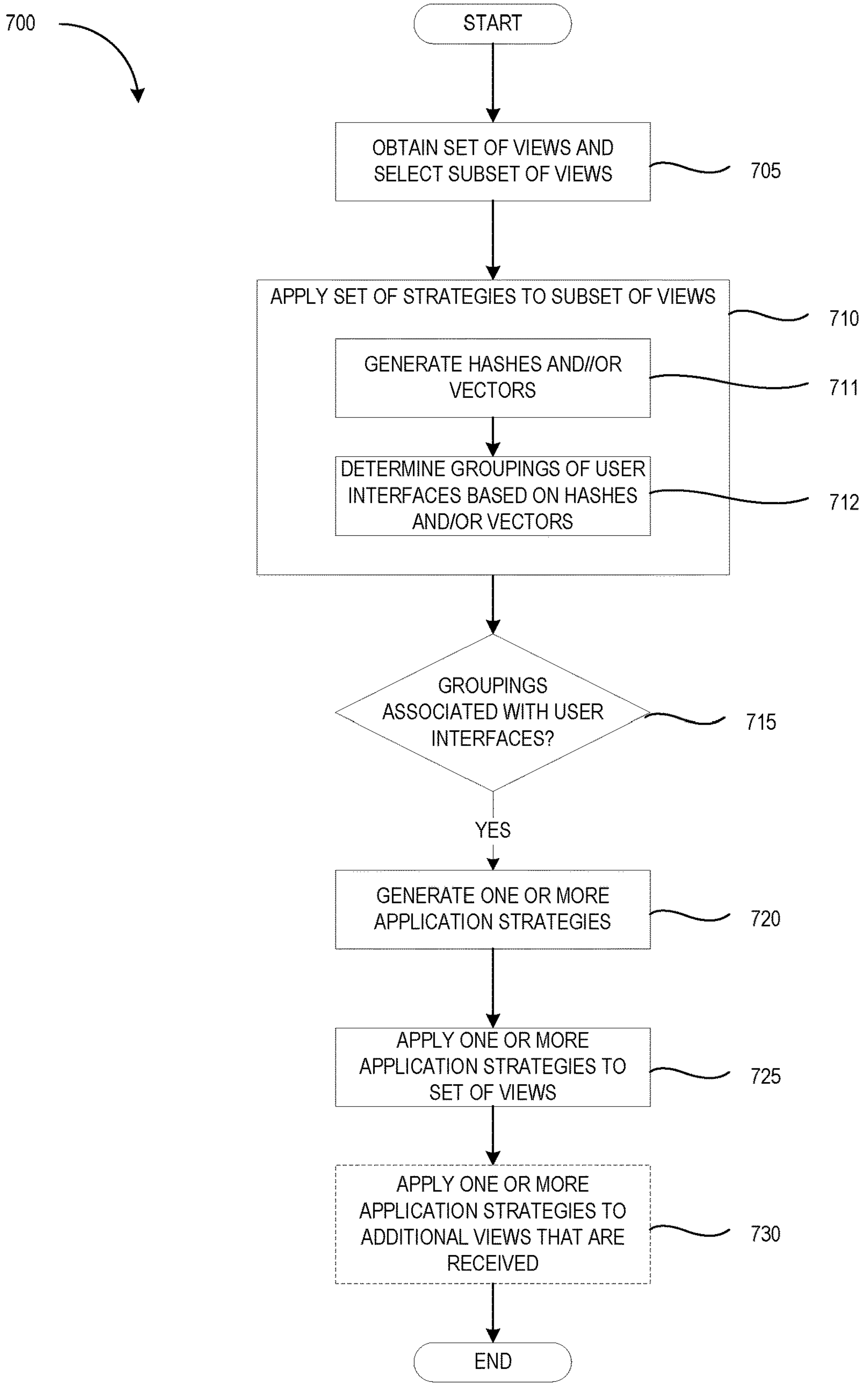
FIG. 7 is a flow diagram of a process for identifying user interfaces, in accordance with one or more embodiments of the present disclosure.

FIG. 7 is a flow diagram of a method 700 for identifying user interfaces, in accordance with one or more embodiments of the present disclosure. Method 700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., a server computer, a desktop computer, etc.), a process discovery system (e.g., process discovery system 110 illustrated in FIG. 1), a UI identification module (e.g., UI identification module 112 illustrated in FIGS. 1-3), and/or various components, modules, engines, systems, etc., of a UI identification module (as illustrated in FIGS. 1-3).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed, and other blocks (which may not be included in FIG. 7) may be performed between the blocks illustrated in FIG. 7.

The method 700 begins at block 705 where the method 700 obtains a set of views and generates (e.g., identifies/selects a subset of views). For example, the method 700 may randomly select the subset of views. At block 710, the method 700 may apply a set of strategies (e.g., provisional strategies) to the subset of views to obtain one or more groupings of user interfaces. For example, the method 700 may generate hashes and/or vectors based on the subset of views at block 711. At block 712, the method 700 may determine the groupings of user interfaces based on the hashes and/or vectors. For example, the method 700 may identify groupings of user interfaces based on similarities (or thresholds of similarities) between hashes/vectors.

At block 715, the method 700 may determine whether the groups of user interfaces are associated with user interfaces of the application. For example, the method 700 may determine whether a first grouping of user interfaces is associated with a first user interface of the application. If the groups of user interfaces are not associated with user interfaces of the application, the method 700 may proceed back to block 705.

If the groups of user interfaces are associated with user interfaces of the application, the method 700 may generate one or more application strategies at block 720. At block 725, the method 700 may apply the application strategies to the set of views (e.g., all of the views in the set of views) to identify user interfaces for the application. At block 730, the method 700 may optionally apply the one or more application strategies to additional views that are received/obtained. For example, an application may be updated (via a software update) to add additional functionality and/or user interfaces. The one or more application strategies may be used to identify the added user interfaces. In another example, the one or more application strategies may be used to identify user interfaces or a new application (e.g., an application that was not previously analyzed/processed by a process discovery system. At this time, an application strategy can be optionally saved a template strategy.

Figure 8:
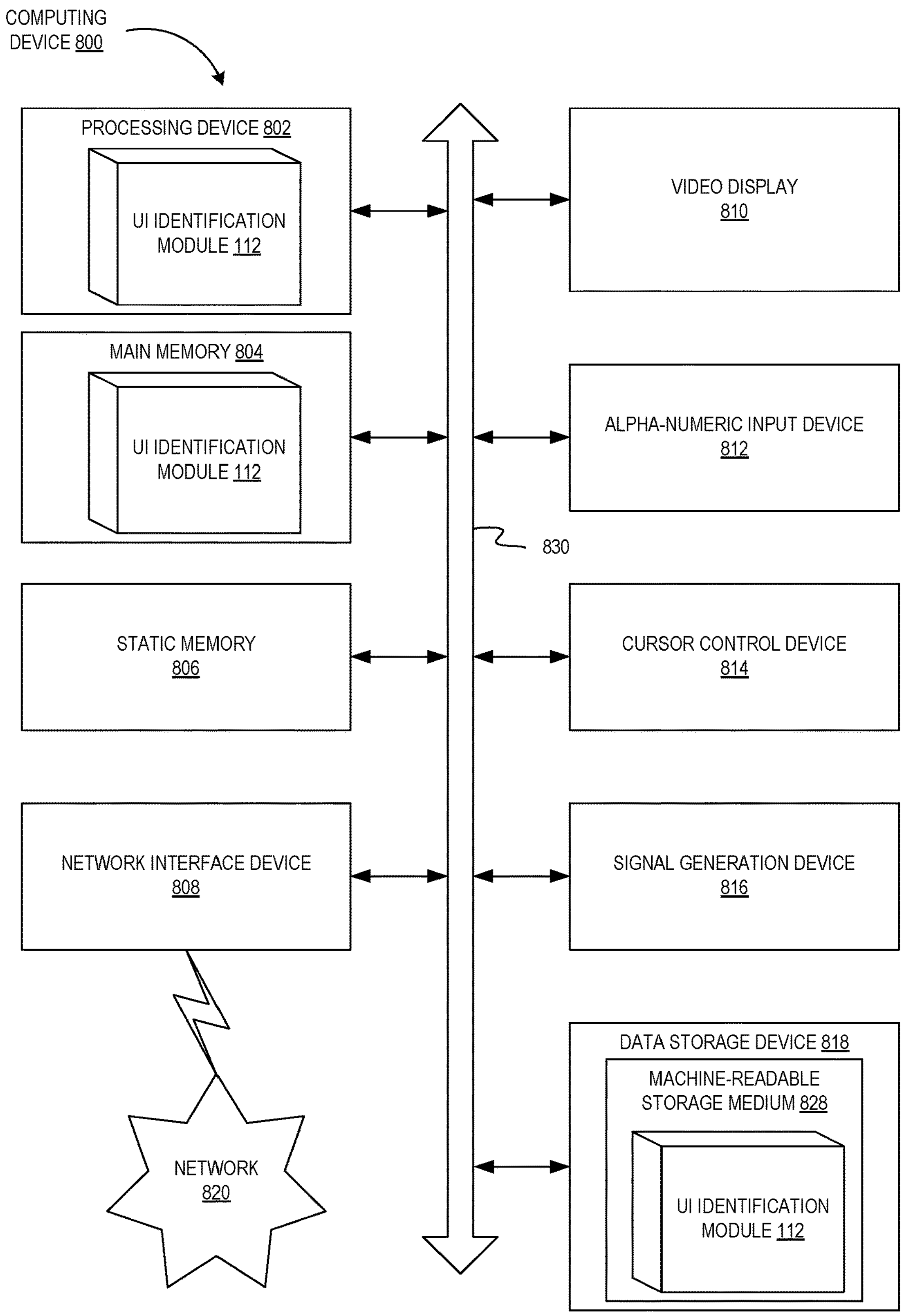
FIG. 8 is a block diagram of an example computing device that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general-purpose processor, a PLD, etc.) 802, a main memory 804 (e.g., synchronous dynamic random-access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions for carrying out the operations described herein, in accordance with one or more aspects of the present disclosure. Instructions 826 implementing the different systems described herein (e.g., the UI identification module 112 illustrated in FIGS. 1-3) may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "determining," "applying," "providing," "obtaining," "hashing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for discovering one or more processes for automation by examining user interfaces of one or more application programs, the method comprising:

obtaining a set of views of user interfaces for an application and a set of metadata associated with the set of views;

applying a set of provisional strategies to a randomly selected subset of the set of views of the user interfaces to generate groupings of user interfaces, wherein each strategy of the set of provisional strategies comprises one or more rules for identifying user interfaces, and wherein the set of provisional strategies are unverified identification strategies that have not been previously validated to correctly identify user interfaces of the application;

determining whether a threshold number of the groupings of user interfaces generated by the set of provisional strategies correspond to user interfaces of the application; and in response to determining that the threshold number of the groupings of user interfaces correspond to user interfaces of the application, generating an application strategy by:

promoting the set of provisional strategies to the application strategy, wherein the application strategy is configured to identify occurrences of a first user interface in user interfaces of one or more additional applications, including applications that have not been previously analyzed to identify their user interfaces.

2. The method of claim 1, wherein each strategy in the set of strategies comprises a set of parameters and the set of parameters comprises one or more of:

a set of tabs that should be in the set of views;

a set of user interface elements that should be in the set of views; a set of labels for the set of user interface elements;

a first set of words that should be in the set of views;

a second set of words that should not be in the set of views; a set of colors that should be in the set of views; and a set of thresholds for grouping views.

3. The method of claim 1, further comprising:

in response to determining that the threshold number of the groupings of user interfaces do not correspond to user interfaces of the application, at least one of adding, removing, or modifying at least one strategy of the set of provisional strategies to generate a modified set of provisional strategies; and reapplying the modified set of provisional strategies to a second randomly selected subset of the set of views to generate a second set of groupings of user interfaces.

4. The method of claim 1, further comprising:

applying the application strategy to the set of views of user interfaces for the application.

5. The method of claim 1, wherein applying the set of provisional strategies to the randomly selected subset of the set of views comprises:

generating one or more of a set of vectors and a set of hashes based on the randomly selected subset of the set of views.

6. The method of claim 5, wherein generating one or more of the set of vectors and the set of hashes comprises:

generating the set of vectors based on a machine learning model and the randomly selected subset of the set of views, wherein the set of vectors represent one or more of visual features and textual features of the randomly selected subset of the set of views.

7. The method of claim 6, wherein applying the set of provisional strategies to the randomly selected subset of views comprises:

determining clusters of visual features based on the set of vectors; and determining the groupings of user interfaces based on the clusters of visual features.

8. The method of claim 5, wherein generating the set of hashes comprises one or more of: hashing each view of the randomly selected subset of the set of views; and hashing text detected in the randomly selected subset of the set of views.

9. The method of claim 8, wherein applying the set of provisional strategies to the randomly selected subset of the set of views comprises: determining the set of groupings based on hamming distances between pairs of hashes in the set of hashes.

10. The method of claim 1, wherein determining whether the threshold number of the groupings of user interfaces correspond to user interfaces of the application comprises:

providing the groupings of user interfaces to a user; and determining, based on user input received in response to providing the groupings of user interfaces, whether the threshold number of the groupings of user interfaces correspond to user interfaces of the application.

11. The method of claim 1, wherein determining whether the threshold number of the groupings of user interfaces correspond to user interfaces of the application is performed based on a machine learning model.

12. The method of claim 1, further comprising:

generating one or more identifiers for the randomly selected subset of the set of views based on the set of provisional strategies.

13. The method of claim 1, wherein the set of provisional strategies are applied to the randomly selected subset of the set of views sequentially.

14. The method of claim 1, wherein a plurality of the set of provisional strategies are applied to the randomly selected subset of the set of views in parallel.

15. The method of claim 1, wherein the applying the set of provisional strategies to the randomly selected subset of the set of views of the user interfaces comprises:

applying a first strategy to the randomly selected subset of the set of views to identify a first grouping of user interfaces; and applying a second strategy to the first grouping of user interfaces to identify the groupings of user interfaces.

16. The method of claim 1, wherein applying the set of provisional strategies to the randomly selected subset of the set of views of the user interfaces comprises:

applying a first strategy to first portions of the randomly selected subset of the set of views; and applying a second strategy to second portions of the randomly selected subset of the set of views.

17. An apparatus, comprising: a memory to store data; and a processing device operatively coupled to the memory, the processing device configured to at least:

obtain a set of views of user interfaces for an application and a set of metadata associated with the set of views;

apply a set of provisional strategies to a randomly selected subset of the set of views of the user interfaces to generate groupings of user interfaces, wherein each strategy of the set of provisional strategies comprises one or more rules for identifying user interfaces, and wherein the set of provisional strategies are unverified identification strategies that have not been previously validated to correctly identify user interfaces of the application;

determine, by an evaluation module, whether a threshold number of the groupings of user interfaces generated by the set of provisional strategies correspond to user interfaces of the application; and in response to determining that the threshold number of the groupings of user interfaces correspond to user interfaces of the application, generate an application strategy by:

promoting the set of provisional strategies to the application strategy, wherein the application strategy is stored in a strategy repository and is configured to identify occurrences of a first user interface in user interfaces of one or more additional applications, including applications that have not been previously analyzed to identify their user interfaces.

18. The apparatus of claim 17, wherein to apply the set of provisional strategies to the randomly selected subset of the set of views of the user interfaces to generate the groupings of user interfaces, the processing device is configured to at least:

generate a set of vectors based on the randomly selected subset of the set of views, and to generate the set of vectors based on a machine learning model and the randomly selected subset of the set of views, wherein the set of vectors represent one or more of visual features and textual features of the randomly selected subset of the set of views.

19. The apparatus of claim 17, wherein the processing device is configured to at least:

in response to determining that the threshold number of the groupings of user interfaces do not correspond to user interfaces of the application, at least one of add, remove, or modify at least one strategy of the set of provisional strategies to generate a modified set of provisional strategies;

and reapply the modified set of provisional strategies to a second randomly selected subset of the set of views to generate a second set of groupings of user interfaces.

20. A non-transitory computer-readable storage medium including instructions for discovering one or more processes for automation by examining user interfaces of one or more application programs that, when executed by a processing device, cause the processing device to at least:

obtain a set of views of user interfaces for an application and a set of metadata associated with the set of views;

apply a set of provisional strategies to a randomly selected subset of the set of views of the user interfaces to generate groupings of user interfaces, wherein each strategy of the set of strategies comprises one or more rules for identifying user interfaces, and wherein the set of provisional strategies are unverified identification strategies that have not been previously validated to correctly identify user interfaces of the application;

determine, by an evaluation module, whether a threshold number of the groupings of user interfaces generated by the set of provisional strategies correspond to user interfaces of the application; and in response to determining that the threshold number of the groupings of user interfaces correspond to user interfaces of the application, generate an application strategy by:

promoting the set of provisional strategies to the application strategy, wherein the application strategy is stored in a strategy repository and is configured to identify occurrences of a first user interface in user interfaces of one or more additional applications, including applications that have not been previously analyzed to identify their user interfaces.

21. The non-transitory computer-readable storage medium of claim 20, wherein to apply the set of provisional strategies to the randomly selected subset of the set of views of the user interfaces to generate the groupings of user interfaces, the processing device is configured to at least:

generate a set of vectors and a set of hashes.

22. The non-transitory computer-readable storage medium of claim 21, wherein to generate the set of vectors and/or the set of hashes, the processing device is configured to at least:

generate the set of vectors based on a machine learning model and the randomly selected subset of the set of views, wherein the set of vectors represent at least one or more of visual features and textual features of the subset of the set of views.

23. The non-transitory computer-readable storage medium of claim 22, wherein the processing device is configured to at least:

in response to determining that the threshold number of the groupings of user interfaces do not correspond to user interfaces of the application, at least one of add, remove, or modify at least one strategy of the set of provisional strategies to generate a modified set of provisional strategies; and reapply the modified set of provisional strategies to a second randomly selected subset of views to generate a second set of groupings of user interfaces.

* * * * *